United States Patent
Bhaskar et al.

(10) Patent No.: US 8,711,759 B2
(45) Date of Patent: Apr. 29, 2014

(54) FRAME TIMING SYNCHRONIZATION IN A GEOSTATIONARY SATELLITE SYSTEM

(75) Inventors: Udaya R. Bhaskar, North Potomac, MD (US); Yezdi Antia, North Potomac, MD (US); Satyajit Roy, Gaithersburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 104 days.

(21) Appl. No.: 13/538,119

(22) Filed: Jun. 29, 2012

(65) Prior Publication Data

US 2013/0315136 A1 Nov. 28, 2013

Related U.S. Application Data

(63) Continuation of application No. 13/479,094, filed on May 23, 2012.

(51) Int. Cl.
*H04B 7/185* (2006.01)

(52) U.S. Cl.
USPC .......................................... 370/316

(58) Field of Classification Search
CPC .. H04W 84/18; H04W 84/12; H04B 7/18582; H04B 7/18584; H04B 7/18508; H04B 7/1851
USPC ................. 370/316, 324, 321, 336, 345, 350, 370/395.62, 503
See application file for complete search history.

(56) References Cited

U.S. PATENT DOCUMENTS

| | | | |
|---|---|---|---|
| 6,535,716 B1 | 3/2003 | Reichman et al. | |
| 6,674,730 B1 * | 1/2004 | Moerder | 370/316 |
| 7,643,515 B2 * | 1/2010 | Willenegger | 370/508 |
| 7,812,718 B1 | 10/2010 | Chan et al. | |
| 8,509,212 B2 | 8/2013 | Sanjeev et al. | |
| 2002/0167917 A1 | 11/2002 | Stephenson et al. | |
| 2004/0192201 A1 | 9/2004 | Febvre et al. | |
| 2006/0050677 A1 | 3/2006 | Schafer | |
| 2009/0023385 A1 | 1/2009 | Blineau et al. | |
| 2010/0034136 A1 * | 2/2010 | Brener et al. | 370/321 |
| 2011/0007647 A1 | 1/2011 | Miller et al. | |
| 2011/0267229 A1 | 11/2011 | Gayrard | |
| 2012/0093072 A1 | 4/2012 | Ragland et al. | |
| 2012/0182181 A1 | 7/2012 | Dai et al. | |

FOREIGN PATENT DOCUMENTS

EP 1233544 A1 8/2002

OTHER PUBLICATIONS

PCT/US13/42379 International Search Report and Written Opinion, dated Jul. 30, 2013.

* cited by examiner

*Primary Examiner* — Anh Ngoc Nguyen
(74) *Attorney, Agent, or Firm* — Potomac Technology Law, LLC

(57) ABSTRACT

Aspects of the invention provide a system and method to allow inroute frame timing synchronization without the aid of hub signal loopback or satellite ephemeris data. Furthermore, it allows tracking and compensating of the satellite motion to allow multiple remotes to use TDMA on the inroute frequencies, while minimizing the aperture. Two main techniques proposed are CLT and polling based approaches, which are used in combination for an optimum solution. In CLT based approach, hub transmits remote specific timing correction feedback messages on the outroute on as needed basis. In polling based approach, the remotes derive their timing based on a per-beam average delay estimate broadcast by the hub and a measured local delay specific to each outroute stream from a remote. An aspect of the invention uses triangulation method to determine satellite position. Furthermore, an aspect of the invention uses hub burst arrival method instead of polling approach.

6 Claims, 21 Drawing Sheets

FRAME TIMING SYNCHRONIZATION IN A GEOSTATIONARY SATELLITE SYSTEM

CROSS-REFERENCE TO RELATED APPLICATIONS

This application is a continuation of U.S. patent application Ser. No. 13/479,094 (filed on 23 May 2012), the entire disclosure of which is fully incorporated herein by reference.

BACKGROUND

The present invention pertains to the field of satellite communications, in particular, frame synchronization techniques in Time Division Multiple Access (TDMA) based systems for communication between multiple remotes and a hub over a satellite link.

A geostationary satellite is an earth orbiting satellite that generally appears to be stationary relative to any point on earth. As will be discussed at great detail later, geostationary satellites "drift" somewhat relative to a point on the Earth. However, generally speaking, they remain stationary. Some of the applications of the geostationary satellites include telephone, internet, television, radio and communication services. Numerous remote sites (remotes) communicate with a central hub through the satellite using TDMA channels. TDMA allows multiple channels to transmit intermittently on the same frequency, but with the timing of their transmission so arranged that the bursts do not overlay when they arrive at the satellite but arrive in sequence and thus are all successfully received by the hub.

In a typical communication system, a hub serves a plurality of remotes located in a set of spot beams. This is further explained with the help of a FIG. 1.

FIG. 1A illustrates an example layout of four spot beams served by a hub.

As illustrated in the figure, a United States map 102 includes the geographical placement of a beam 104, a beam 106, a beam 108, a beam 110 and a hub 112.

Hub 112 serves a plurality of remotes located in beam 104, beam 106, beam 108 and beam 110 through a satellite (not shown). Hub 112 and its remotes are connected in a star topology with hub 112 at the center of the star and the remotes at the point of the star. In this example only one hub is shown, however, there may be multiple hubs, each serving its own set of beams. In another example, a hub located in one continent may be serving the beams located in other continents. Location of remotes within a beam is further explained with the help of a FIG. 1B.

FIG. 1B illustrates beam 104 with a set of remotes.

As illustrated in the figure, a remote 114, a remote 116 and a remote 118 are located inside beam 104, whereas a remote 120 and a remote 122 are located outside beam 104. In this example, only remote 114, remote 116 and remote 118 are served by hub 112 since remote 120 and remote 122 are located outside beam 104. Remote 120 and remote 122 may be served by another hub.

FIG. 2 illustrates communication between a hub and the remotes via a satellite.

As illustrated in the figure, hub 112 communicates with remote 114, remote 116 and remote 118 via a satellite 202. Hub 112 and its remotes are connected in a star topology with hub 112 at the center of the star and the remotes at the point of the star. Remote 114, remote 116 and remote 118 use TDMA to access shared inroute channels for transmissions through satellite 202 to hub 112. Several remotes share one inroute channel to communicate with hub 112, hence sharing the bandwidth. There could be several inroutes associated with one outroute. As illustrated in the figure, remote 114, remote 116 and remote 118 are allocated a frequency $f_1$ and time slots $t_1$, $t_2$ and $t_3$ respectively in TDMA mode.

For a given beam, the propagation time from a remote to the hub through the satellite can vary by several milliseconds (ms) for different remotes within a beam. For example, for beam 104, the propagation time for remote 114 is $d_1$, for remote 116 is $d_2$ and for remote 118 is $d_3$, where $d_1$, $d_2$ and $d_3$ may have same or different values. Further, as satellite 202 moves in its orbit, the propagation time between each of remote 114, remote 116 and remote 118 and hub 112 via satellite 202 varies continuously. The change in the propagation delay as a result of the change of position of the satellite is a drift delay.

TDMA requires that each remote transmits its data bursts to the satellite for relay to the hub such that the bursts start within a narrow window of time, known as the aperture, in a specified slot of a particular frame at the hub. The variations in the propagation delay between the remotes and the hub require that each hub and remote execute procedures to determine exactly when the remote should transmit a data burst, so that it will arrive at the hub in the assigned frames at the assigned times (i.e., within the aperture). This is explained below for a TDMA frame with the help of FIG. 3.

FIG. 3 illustrates a typical TDMA frame.

As illustrated in the figure, a TDMA frame 300 includes a time axis 302, a time axis 304, a slot 306, a slot 308 and a slot 310. In this example, slot 306 is assigned to remote 114, slot 308 is assigned to remote 116 and slot 310 is assigned to remote 118. A guard period 312 is assigned between each slot to allow for slight mistiming between each burst in order to avoid collision at the receiver. In most cases, a unique word (UW) is transmitted at the beginning of each burst for the receiver to recognize the start of a burst (not shown).

Hub 112 broadcasts each remote a burst time plan in order to assign particular time slots to use in TDMA frame 300. The burst time plan may be fixed, so as to assign each remote a particular portion of the total TDMA frame period or it may be dynamic, whereby the timeslot allocated is adjusted in response to the traffic needs of each remote.

Depending on the geographical location of the remote with respect to the hub, each remote should transmit its bursts such that all the bursts arriving at the hub should appear in the correct place. Remotes further away from the satellite should transmit earlier than the remotes closer to the satellite. Referring back to FIG. 2, remote 114 is closer to hub 112 than remote 118 ($d_3 > d_1$), therefore remote 118 should start transmitting before remote 114. Similarly, remote 116 is closer than remote 114 ($d_1 > d_2$), therefore remote 114 should start transmitting before remote 116. This would guarantee that the bursts from remote 114, remote 116 and remote 118 will arrive at hub 112 in the correct sequence at the assigned times.

As discussed with reference to FIG. 3, an inroute TDMA frame 300 consisting of bursts from remote 114, remote 116 and remote 118 arrives at hub 112 in the correct sequence after a certain delay corresponding to the propagation delay between the remotes and the hub.

Hence multiple remotes can communicate to the hub via a satellite using the same inroute frequency in a TDMA based system so that there are no collisions. When the satellite is stationary in the sky, the distance between the remotes to the satellite to the hub is known since the satellite is not moving. Therefore the propagation delay between the remotes to the hub via the satellite is known because the distance between them is fixed. If one remote is closer to the satellite than a second remote, then the first remote will transmit with a delay that is somewhat less than a delay associated with the second remote. The different delays (based on the different geographical locations of the remotes, respectively) ensure that the satellite will receive the transmissions from the first remote and the second remote at the correctly specified TDMA time slots.

If the satellite is moving then the distance between the remotes and the hub is constantly changing. In these situations, inroute (remote to hub) frame synchronization is essential for any TDMA based system to allow multiple remotes to use a single inroute frequency without collisions.

In traditional communication systems, ephemeris data is used to determine the satellite motion, which describes the path that the satellite is following as it orbits the earth. Accordingly, ephemeris data is needed at the gateway.

Another known method called "hub signal loopback" requires hub being capable of receiving its own transmit signal in order to provide hub to satellite round trip delay for tracking the satellite motion. In this case, a remote is co-located at the hub. When the hub transmits a signal, it is echoed back to the remote that is sitting right next to the hub. The hub can then determine the propagation delay by measuring the delay between the transmission and the reception of the signal and therefore controls the timing of the remotes. However, in certain systems, the hub is not located inside a spot beam, and hence is not able to receive what it had transmitted earlier. In this situation the "hub signal loopback" is not applicable.

What is needed is a system and method to provide inroute frame synchronization for tracking and compensating of the satellite motion to allow multiple remotes to use TDMA on the inroute frequencies.

BRIEF SUMMARY

The present invention provides a system and method to provide inroute frame synchronization for tracking and compensating of the satellite motion to allow multiple remotes to use TDMA on the inroute frequencies, while minimizing the aperture.

In accordance with an aspect of the present invention, a hub is provided for use with a plurality of remotes and a satellite. The satellite can bi-directionally communicate with each of the remotes and the hub. The hub includes a communication portion and a polling portion. The communication portion can bi-directionally communicate with the satellite. The polling portion can poll a number N of the plurality of remotes to obtain a drift value for each polled remote, respectively. A drift value is based on a difference between an initial timing reference and a subsequent timing reference as a result of a change of position of the satellite.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

Figure 1A:
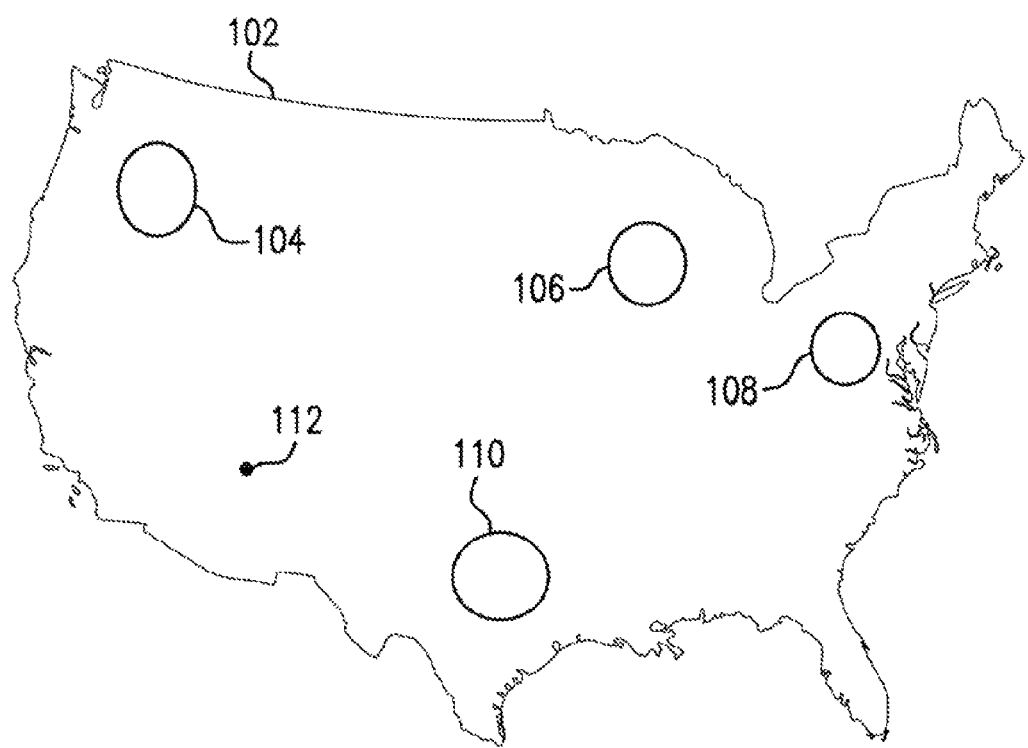
FIG. 1A illustrates an example layout of four spot beams served by a hub.
Figure 1B:
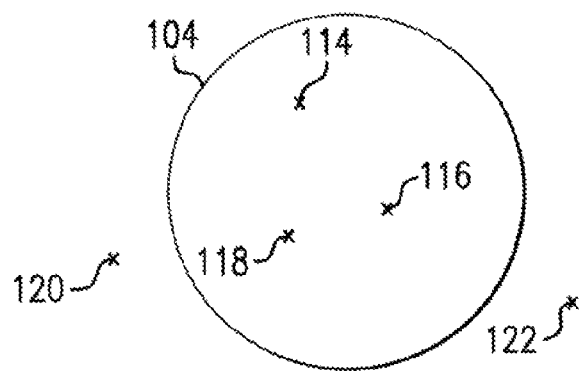
FIG. 1B illustrates beam 104 with a set of remotes.
Figure 2:
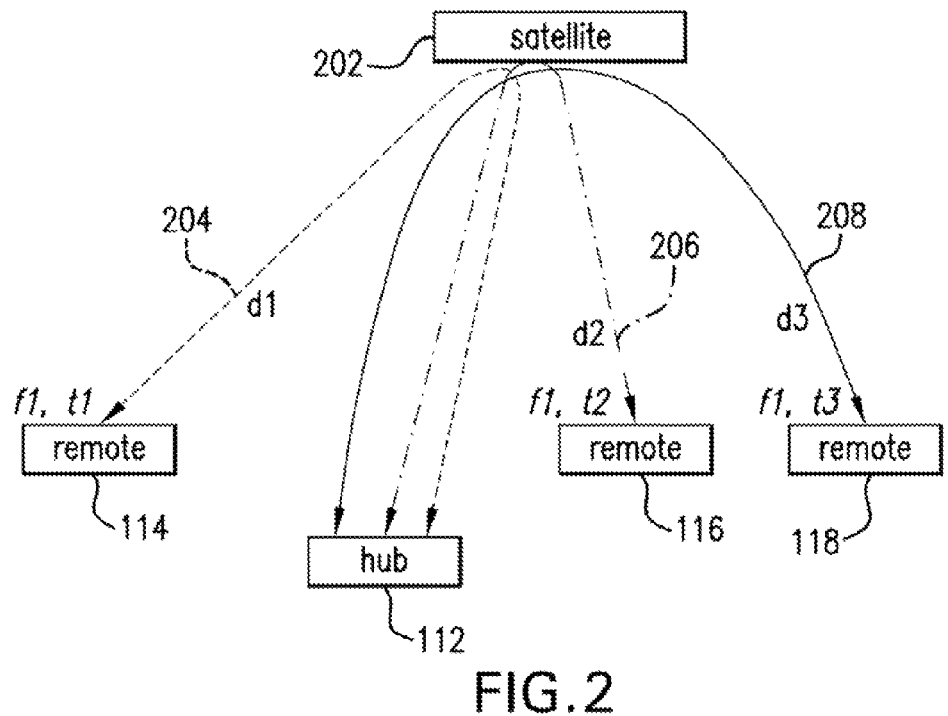
FIG. 2 illustrates communication between a hub and the remotes via a satellite.
Figure 3:
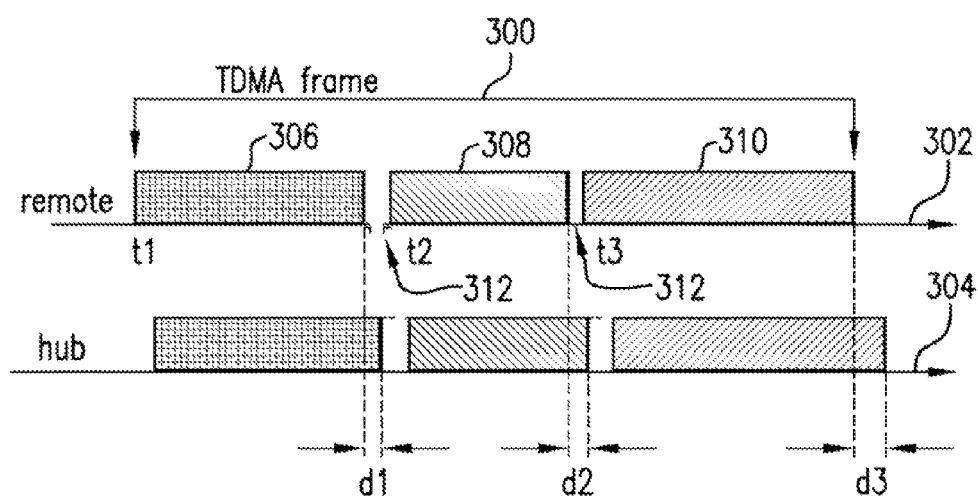
FIG. 3 illustrates a typical TDMA frame.

Aspects of the invention provide a system and method to allow inroute frame timing synchronization without the aid of hub signal loopback or satellite ephemeris data. Furthermore, it allows tracking and compensating of the satellite motion to allow multiple remotes to use TDMA on the inroute frequencies, while minimizing the aperture.

Timing synchronization relies on the estimation of drift at the hub, which is provided to remotes to calculate their timing. Aspects of the invention provide two techniques for timing synchronization, which can be combined in different ways for an optimum design. The first approach is CLT based, in which hub transmits remote specific timing correction feedback messages on the outroute on as needed basis. The second approach is a polling based approach, where the remotes derive their timing based on a per-beam average delay estimate broadcast by the hub and a measured local delay specific to each outroute stream from a remote. The hub calculates the per-beam average delay based on the polling responses from few selected remotes based on the polling requests. Both CLT and polling based approaches will be discussed in greater detail later.

When a system is launched, the hub is constantly trying to find if there are any active remotes in the network. Initially when the system is launched, there are no active remotes for a certain period of time. This is known as the "boot strap phase." Since there is not much traffic in the absence of multiple remotes, a method called "boot strap aloha" is used, where the remotes transmit and the hub receives such that it allows the timing of the remotes to be off by a large value. In this case, the hub can tolerate extremely inaccurate transmission time, in the order of milliseconds.

In any system, in order for a remote that has not received any bandwidth allocation for it to enter the system, a certain number of contention channels are available for grabs for any remote. These channels are designated as slotted aloha or aloha channels. When a remote wakes up after being idle for a long time, it would initially go on to transmit on aloha channels to request for initial bandwidth, which is received by the hub on a very coarse, inefficient and wide aperture channel. Once the hub receives the transmission by such remote, it will allocate the remote its bandwidth and provide the initial timing correction. The remote will then move off of aloha channels and use the regular TDMA channel. Since aloha channels are contention channels, there is no guarantee that only one remote will be using it at any time, therefore, there exists a possibility of collision. However, when the network is lightly loaded, the probability of collision is small so the transmission using aloha channels is acceptable.

After the initial bandwidth allocation, when the remote starts transmitting on a regular TDMA slot, it starts off from the timing correction received with the bandwidth request. Due to the satellite motion, after transmitting for certain duration, for example, in the order of seconds, the timing will continuously drift since the remotes do not have any timing reference. The hub is continuously monitoring the error with which a packet or a burst is being received. When the hub receives a burst that is too close to the edge of the aperture, or in other words, it crosses a certain threshold of error, the hub sends a "closed loop timing feedback message" to the remote indicating that the remote has drifted off from the center of the aperture by, for example, 'X' microseconds and requests the remote to adjust its timing by 'X' microseconds. The remote gets back to the center again once it receives the "closed loop timing feedback message" from the hub. The feedback message between the remote and the hub continues whenever the remote moves away from the center of the aperture. This is called CLT mechanism. This is further explained with the help of FIG. 4.

Figure 4:
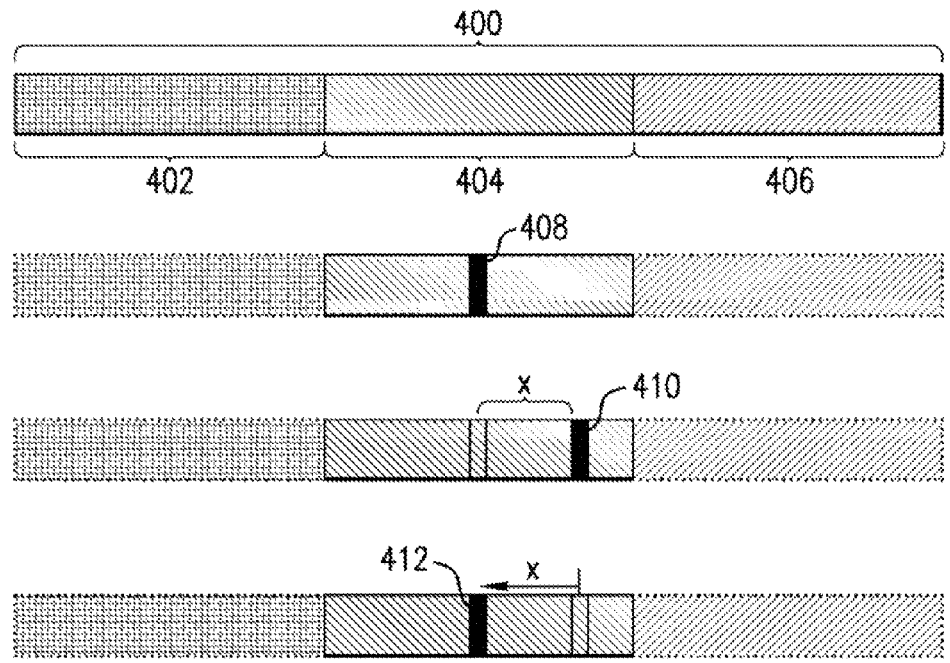
FIG. 4 illustrates timing relationship for a Closed Loop Timing (CLT) approach, in accordance with an aspect of the invention.

FIG. 4 illustrates timing relationship for CLT approach, in accordance with an aspect of the invention.

As illustrated in the figure, a TDMA frame 400 includes a burst arrival aperture 402, a burst arrival aperture 404 and a burst arrival aperture 406. In one embodiment, burst arrival aperture 402 corresponds to remote 114, burst arrival aperture 404 corresponds to remote 116 and burst arrival aperture 406 corresponds to remote 118.

A burst 408 is transmitted by remote 114 to hub 112 via satellite 202 in a inroute channel. Due to the satellite motion, burst 408 is received by hub 112 after a drift delay 'X' microsecond at a location 410. Assuming that burst 408 is received too close to the edge of the aperture, hub 112 sends a closed loop feedback message to remote 114 indicating that remote 114 has drifted off from the center of the aperture by 'X' microseconds and requests remote 114 to adjust its timing by 'X' microseconds. Remote 114 gets back to the center again, as shown by a location 412, once it receives the "closed loop timing feedback message" from hub 112.

CLT is used to constantly correct the remote timing. If there are multiple remotes on the beam, the hub sends the correction messages to each one of them as needed.

When a new remote comes in to the system, it ranges and it saves a certain timing reference value. Once a certain number of remotes have entered the system, i.e., enough remotes have become active in the beam, and have saved their timing reference value, the hub decides to start the polling based approach. The hub sends out a polling request to a few selected remotes, for example randomly selected remotes, and receives a certain number of polling responses. Based on the polling responses, the hub computes the delay estimate and broadcasts it to all the remotes in the beam. At this point, the system transitions into a steady state, as will be described in greater detail below. In essence, the remotes use this delay estimate for timing of their transmission instead of using CLT feedback.

The CLT feature provides timing adjustment feedback to the remotes, which allows the remotes to transmit as close as possible to the middle of the burst aperture. However, CLT is not sufficient in itself as it can only maintain synchronization after initial synchronization was achieved previously. Remotes receive CLT corrections only when they are active. After an idle interval, synchronization may be lost. Aspects of the invention provide methods using CLT and polling based approach in combination for an optimum solution.

Each hub manages the inroute timing synchronization of each of its beams independently of the other beams in that hub and other hubs and beams. A number of inroute carriers may be associated with each outroute carrier. In one embodiment, each of these carriers carries a number of continuous DVB-S2 (Digital Video Broadcasting-Satellite-Second generation) data streams to the satellite for broadcast to the remotes in the beam.

In one embodiment, a novel method for frame timing synchronization, in accordance with an aspect of the invention, includes the following main actions, which will be discussed in greater detail later: 1) saving of timing references by the remotes during initial ranging or a subsequent bootstrap aloha procedure, when it transitions to steady state (as will be described in greater detail below); 2) ongoing polling of a small set of remotes by the hub to obtain drift delays as seen by the remotes; 3) selection of a subset of polling responses at the hub to satisfy geographical diversity requirements; 4) processing of the drift delays in polling responses at the hub to compute a time delay value—in an example embodiment, the drift delays in polling responses are averaged at the hub to compute a beam-average time delay value; 5) advertising of this beam-average time value by the hub in a Superframe timing marker packet transmitted to all the remotes in the beam; 6) computation of the frame timing at the remote based on the advertised beam-average value and the remote's saved references; 7) a polling outage phase to handle cases when the number of responses to polling is insufficient, based on closed loop timing feedbacks from hub to remotes; and 8) a bootstrap phase to handle hub initial startup and hub switchover cases based on closed loop timing feedbacks from hub to remotes.

An example embodiment of a hub and a remote is described below with the help of FIGS. 5A-5B.

Figure 5A:
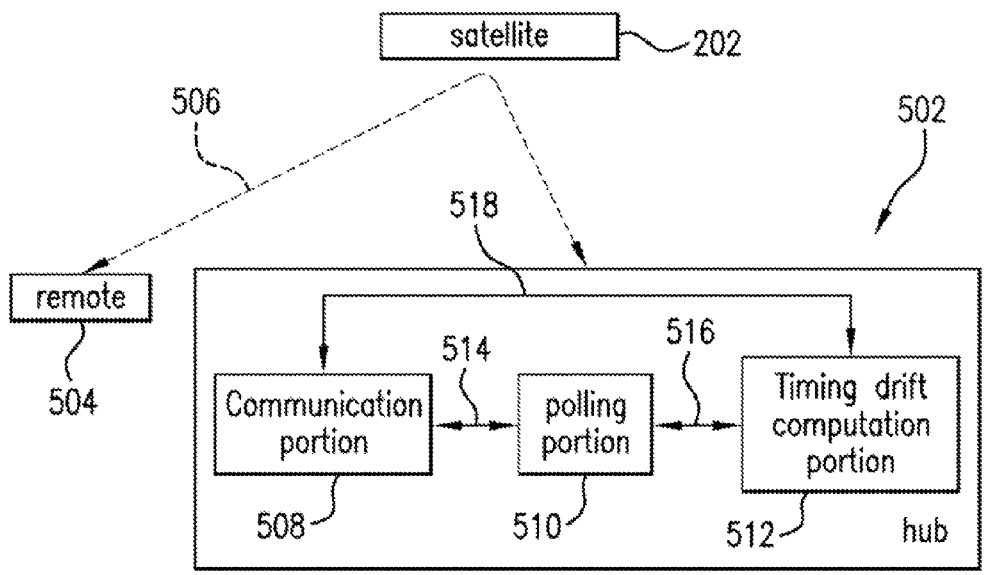
FIG. 5A illustrates an example embodiment of a hub, in accordance with an aspect of the invention.

FIG. 5A illustrates an example embodiment of a hub, in accordance with an aspect of the invention.

As illustrated in the figure, a hub 502 communicates with a remote 504 via satellite 202. Hub 502 further includes a communication portion 508, a polling portion 510 and a drift delay computation portion 512. In this example, communication portion 508, polling portion 510 and drift delay computation portion 512 are distinct elements. However, in some embodiments, at least two of communication portion 508, polling portion 510 and drift delay computation portion 512 may be combined as a unitary element. In other embodiments, at least one of communication portion 508, polling portion 510 and drift delay computation portion 512 may be implemented as a computer having stored therein tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a tangible computer-readable medium. Combinations of the above should also be included within the scope of tangible computer-readable media.

Hub 502 is operable to bi-directionally communicate with remote 504 and satellite 202 via a signal 506. For illustrative purposes, remote 504 is shown in FIG. 5A, however, hub 502 may be connected to a plurality of remotes in a typical communication system. Communication portion 508 bi-directionally communicates with polling portion 510 via a signal 514 and with drift delay computation portion 512 via a signal 518.

Polling portion 510 is operable to generate poll requests, which are transmitted to the remotes. It bi-directionally communicates with drift delay computation portion 512 via a signal 516.

Drift delay computation portion 512 is operable to process the drift delay based on the polling responses from the remotes. Hub 502 broadcasts the computed drift delay to all the remotes within the beam.

Functionality of different portions of hub 502 will be discussed in greater detail later.

Figure 5B:
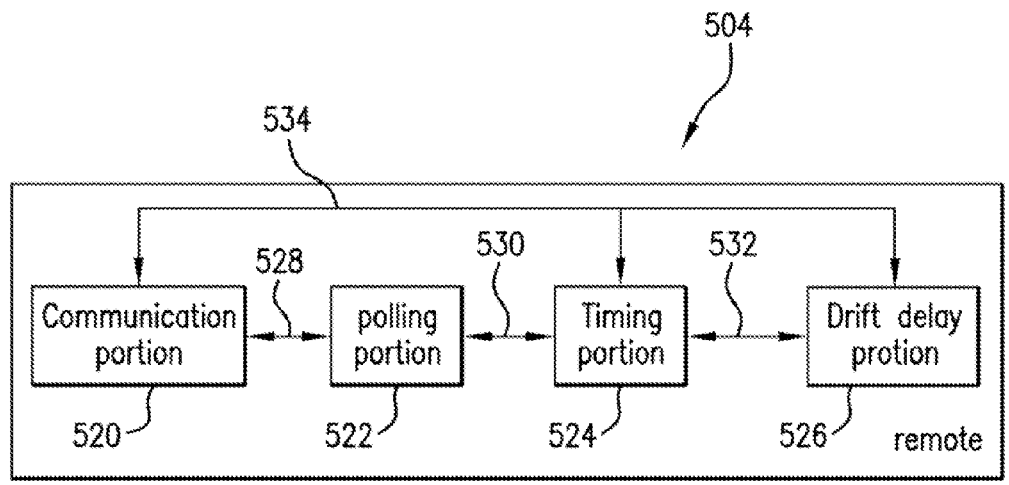
FIG. 5B illustrates an example embodiment of a remote, in accordance with an aspect of the invention.

FIG. 5B illustrates an example embodiment of a remote, in accordance with an aspect of the invention.

As illustrated in the figure, remote 504 includes a communication portion 520, a polling portion 522, a timing portion 524 and a drift delay portion 526. In this example communication portion 520, polling portion 522, timing portion 524 and drift delay portion 526 are distinct elements. However, in some embodiments, at least two of communication portion 520, polling portion 522, timing portion 524 and drift delay portion 526 may be combined as a unitary element. In other embodiments, at least one of communication portion 520, polling portion 522, timing portion 524 and drift delay portion 526 may be implemented as a computer having stored therein tangible computer-readable media for carrying or having computer-executable instructions or data structures stored thereon.

Communication portion 520 bi-directionally communicates with polling portion 522 via a signal 528 and timing portion 524 and drift delay portion 520 via a signal 534.

Polling portion 522 is operable to transmit polling responses to hub 502 in response to the polling requests. It bi-directionally communicates with timing portion 524 via a signal 530.

Timing portion 524 is operable to generate a timing reference at system transition states, which is used to generate drift delay. It bi-directionally communicates with drift delay portion 526 via a signal 532.

Drift delay portion 526 is operable to generate a delay drift value, which is transmitted back to hub 502.

Functionality of different portions of remote 504 will be discussed in greater detail later.

The hub serves as the reference for inroute frame timing. Remotes may maintain synchronization of their inroute frame timing to the hub reference. The hub aids remotes in this process by providing the information needed to maintain frame number and frame timing synchronization.

In one embodiment, a per-beam approach is used, where a single timing process is used for all the remotes in the beam. This implies that a single entity at the hub may process and generate all the information needed to maintain synchronization. This may be a disadvantage from an implementation perspective, since the polling responses received on all the inroutes has to be directed to a single hub process, processed and the resulting delay estimate distributed to all the different outroutes. The advantage is that the polling is conducted across the largest possible pool of remotes, which means that the probability of polling outage during periods of low network activity is reduced. Note that the example method described herein follows the per-beam approach, however, the aspects of the invention are equally applicable to per-outroute or other approaches with smaller remote groups.

Figure 6:
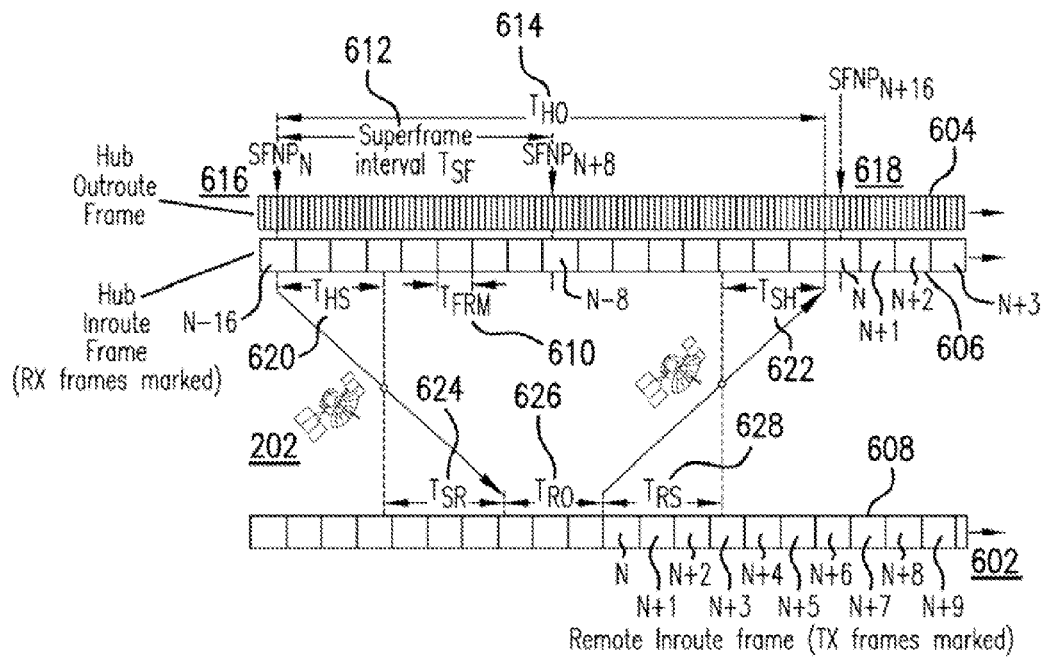
FIG. 6 illustrates the timing relationship between the hub and the remote in accordance with an aspect of the invention.

Timing relationship between the hub and the remote is better explained with the help of FIG. 6.

FIG. 6 illustrates the timing relationship between the hub and the remote in accordance with an aspect of the invention. In one embodiment, hub is hub 502, remote is remote 504 and satellite is satellite 202.

As illustrated in the figure, an inroute time axis 602 is divided in to slots, frames and superframes. A hub outroute frame 604 and a hub inroute frame 606 denote the timing relationship on the hub side. A remote inroute frame 608 denotes the timing relationship on the remote side. An inroute frame duration 610 is denoted as TFRM, which in one embodiment is 45 ms. A superframe interval 612 is denoted as $T_{SF}$. Frame duration 610 is such that a superframe will contain an integer number (M) of frames. Each frame contains an integer number of slots (NSL) and each slot contains an integer number of symbols (NSYM).

Remotes access the inroute by transmitting in bursts, each of which occupies multiple slots. A unique word is placed at the start of the burst in order to allow burst detection at the hub. The burst can be detected only if the last symbol of the unique word arrives within the aperture.

In order to time its bursts correctly, the remotes may establish a time reference that is tightly synchronized to the hub's time reference and also take into account time varying propagation delays. For example, by itself, the standard DVB-S2 outroute does not have any time marker that a remote can use to synchronize its time reference with the hub's. In one embodiment, each hub broadcasts on the outroute a timing reference, in the form of a SuperFrame Numbering Packet (SFNP), to all remotes in the beam. The SFNP is transmitted by the hub on the outroute once every $T_{SF}$. Each unicast DVB-S2 stream carries a separate SFNP, which provides the timing reference to the remotes assigned to that particular DVB-S2 stream. A separate SFNP for each outroute stream is necessary since the local delay between the intended and actual times of SFNP transmission can be different for different outroute streams, which will be discussed in greater detail later.

$SFNP_N$ is the Superframe Numbering Packet that marks frame N. As illustrated in the figure, different timings are denoted by the following. $T_{HO}$ is a hub offset time 614, which is the time between transmission of $SFNP_N$ at the hub and the start of reception of frame N at the hub. This is also known as space-time offset (STO). A time 616 denotes the transmission of $SFNP_N$ and a time 618 denotes the transmission of $SFNP_{N+16}$. $T_{HS}$ is a hub to satellite propagation time 620. $T_{SR}$ is a satellite to remote propagation time 624. $T_{RO}$ is a remote offset time 626, which is the time between "ideal" receipt of $SFNP_N$ at a remote and the transmit time for the start of transmission for frame N at this remote. $T_{RS}$ is a remote to satellite propagation time 628 (same value as $T_{SR}$). $T_{SH}$ is a satellite to hub propagation time 622.

Note that:

$$T_{HO}=T_{HS}+T_{SR}+T_{RO}+T_{SH} \quad (1)$$

The hub-to-satellite round-trip time, $T_{HS}+T_{SH}$, can also be written as $T_{HSH}$. In other words, $T_{HSH}$ is propagation delay as a result of transmission from the hub to the satellite and the transmission from the satellite to the hub. Hence, $$T_{HO}=T_{HSH}+T_{SR}+T_{RO}+T_{RS} \quad (2)$$

Starting at system launch, hub transmits a SFNP every $T_{SF}$ msec on each unicast DVB-S2 stream of each carrier of each beam. A remote bases its frame timing on the SFNP received over the unicast DVB-S2 stream to which it is assigned. For the purposes of inroute timing, the SFNP contains the following fields: an inroute frame number; an SPNP local delay; a $T_{HSH-EST}$; a system state; a CLT ON flag; and the hub restart/switchover identification.

With respect to the inroute frame number N, the time of transmission of SFNP with frame number N ($SFNP_N$) serves as a marker for the start of hub inroute frame N. In FIG. 6, it is represented by time 616.

With respect to the SFNP local delay, this is the delay between the intended and actual times of SFNP transmission at the hub. The local $SFNP_{N-M}$ delay is measured at the hub and transmitted as part of the $SFNP_N$ to allow the remote to compensate for the local delay in the transmission of $SFNP_{N-M}$. M is the number of frames/superframe.

With respect to the $T_{HSH-EST}$, this is used by the remotes to compute the $T_{RO}$ in order to time inroute burst transmissions. In bootstrap state, this value is computed using hub coordinates and assuming that the satellite is at the center of its station keeping box ($T_{HSH-NOM}$), also known as the center of box (CoB). In steady state, this value is computed using the information contained in polling responses. In polling outage state, the CoB value is used.

With respect to the system state, this is used by the hub to signal remotes the current hub state. It can take on values of 0, 1 or 2, corresponding to bootstrap state, steady state and polling outage state respectively. Remotes monitor this field in the SFNP and follow different procedures depending on its value. If it is 0 indicating bootstrap state, remotes rely on bootstrap aloha/CLT for timing. When the value changes from 0 in the previous SFNP to 1 in the current SFNP, a bootstrap to steady state transition has occurred. Active remotes that see this transition save their references. If the value of this field is 1 indicating steady state, remotes can compute $T_{RO}$ based on the $T_{HSH-EST}$ or rely on CLT (depending on the CLT ON Flag). If this field is 2, indicating polling outage, remotes rely on bootstrap aloha/CLT for timing. However, active remotes do not save references when hub transitions from polling outage to steady state (in contrast to the bootstrap to steady state transition).

With respect to the CLT ON flag, this is used by the hub to signal remotes the inroute timing mechanism that is currently used. If this flag is TRUE, the system is using the CLT mechanism and hub provides timing corrections to remotes. If it is FALSE, the system is depending on the $T_{RO}$ computation mechanism at the remotes. If a remote receives a CLT feedback while the CLT ON flag is FALSE, it ignores the CLT feedback.

With respect to the hub restart/switchover identification, this field contains information to allow a remote to detect if either of the following events occurred while it was idle or powered off: 1) a switchover from the hub on which it had saved references to a different hub: or 2) a restart of the hub on which it had saved references.

As illustrated in FIG. 6, the hub starts the inroute TDMA frame N one time interval, $T_{HO}$, after it transmits the $SFNP_N$. $T_{HO}$ may be set large enough that an SFNP can be received by a remote that is farthest from the satellite, have that remote do some processing, then transmit a data burst in time to be received back at the hub at the start of the frame number given in the SFNP packet. If the $T_{HO}$ satisfies this condition, it means that a remote can receive a bandwidth allocation packet (BAP) and have sufficient time for processing and transmission of the burst on the bandwidth allocated in the BAP.

In practice, the actual instant of SFNP transmission is slightly delayed from the intended instant of SFNP transmission due to transmission processing in the hub. Note that the $T_{HO}$ is measured from the intended instant of SFNP transmission. The delay between the intended and the actual instants of transmission is measured at the hub and broadcast in the next SFNP. Remotes use this to correct for this delay as will be discussed in greater detail later.

If a remote transmits at the end of its $T_{RO}$ interval after receiving $SFNP_N$, the hub will receive the burst in the first slot within frame N. If the remote needs to transmit at a later slot in the frame N (or in a slot in frames N+1–N+M–1), it adds the time delay for this slot (and this frame) to the end of $T_{RO}$ interval to determine the time of transmission.

Correct burst timing requires the knowledge or estimation of the $T_{RO}$ at the remote. A more accurate $T_{RO}$ allows the use of a smaller aperture to receive the burst at the hub. It is desirable to keep the aperture as small as possible, since aperture becomes a significant overhead and reduces throughput. However, aperture size cannot be reduced below a minimum value. This limitation is due to the timing measurement errors in the hub or remote and the approach used to compute $T_{RO}$. The following considerations may be taken into account: availability of the satellite ephemeris data; accuracy of remote location information; satellite drift in its ephemeris orbit (satellite box); geographic distribution of remotes; timing measurement errors; and absence of hub loopback.

With respect to the availability of the satellite ephemeris data, satellite ephemeris data is not available for the purposes of inroute frame timing. This means that hub to satellite propagation delay 620 ($T_{HS}$) is unknown.

With respect to the accuracy of remote location information, remote location information is not GPS (Global Positioning System) based and is known only to the accuracy of the center of the nearest zip code region. This means that remote to satellite propagation delay 624 ($T_{SR}$) is inaccurate. However, in other embodiments, GPS location information may be used to further reduce the aperture size.

With respect to the satellite drift in its ephemeris orbit (satellite box), as the satellite moves in its orbit, $T_{HS}$ and $T_{SR}$ change continuously and $T_{RO}$ needs to be recomputed to account for these changes.

With respect to the geographic distribution of remotes, beam radii are of the order of hundreds of kilometer (km). At any given time instant, remotes within a beam can have $T_{RO}$ values differing from each other.

With respect to the timing measurement errors, clocks used in the system, outroute and inroute symbol timing, timing of burst transmission and measurement of burst arrival, all have small but finite errors, which contribute to the size of the aperture.

With respect to the absence of hub loopback, hubs are not capable of receiving their own outroute transmissions. This eliminates the possibility of using "hub loopback" delay measurements at the hub for the purposes of frame timing.

Given the above constraints, the system (hub and remotes) may employ procedures to estimate $T_{RO}$ at each remote as accurately as possible. At a minimum, aperture may be wide enough to accommodate the total worst case error due to errors in $T_{RO}$ estimation, clock synchronization and timing measurements cited above. Other considerations may make it necessary to operate with a larger than minimum aperture size (for example, balance the outroute overhead due to timing correction messages against the inroute overhead due to increased aperture length).

The inroute frame timing design presented in accordance with aspects of the invention uses a combination of four techniques. The selection of using a particular technique will depend upon the states of the system and the remote. The techniques used are: 1) $T_{RO}$ computation at the remote; 2) $T_{RO}$ corrections from the hub (CLT); 3) Ranging; and 4) Bootstrap Aloha.

When the system is initially launched or if it is in an outage state, the system relies on bootstrap aloha and CLT feedback to remotes to maintain inroute timing. Newly installed remotes use ranging to gain initial timing. When the system is in steady state, hub can activate either CLT or $T_{RO}$ computation to maintain timing by computing a timing estimate ($T_{HSH-EST}$) accordingly. The state transitions between different states are further explained with the help of FIG. 7 and FIG. 8.

Figure 7:
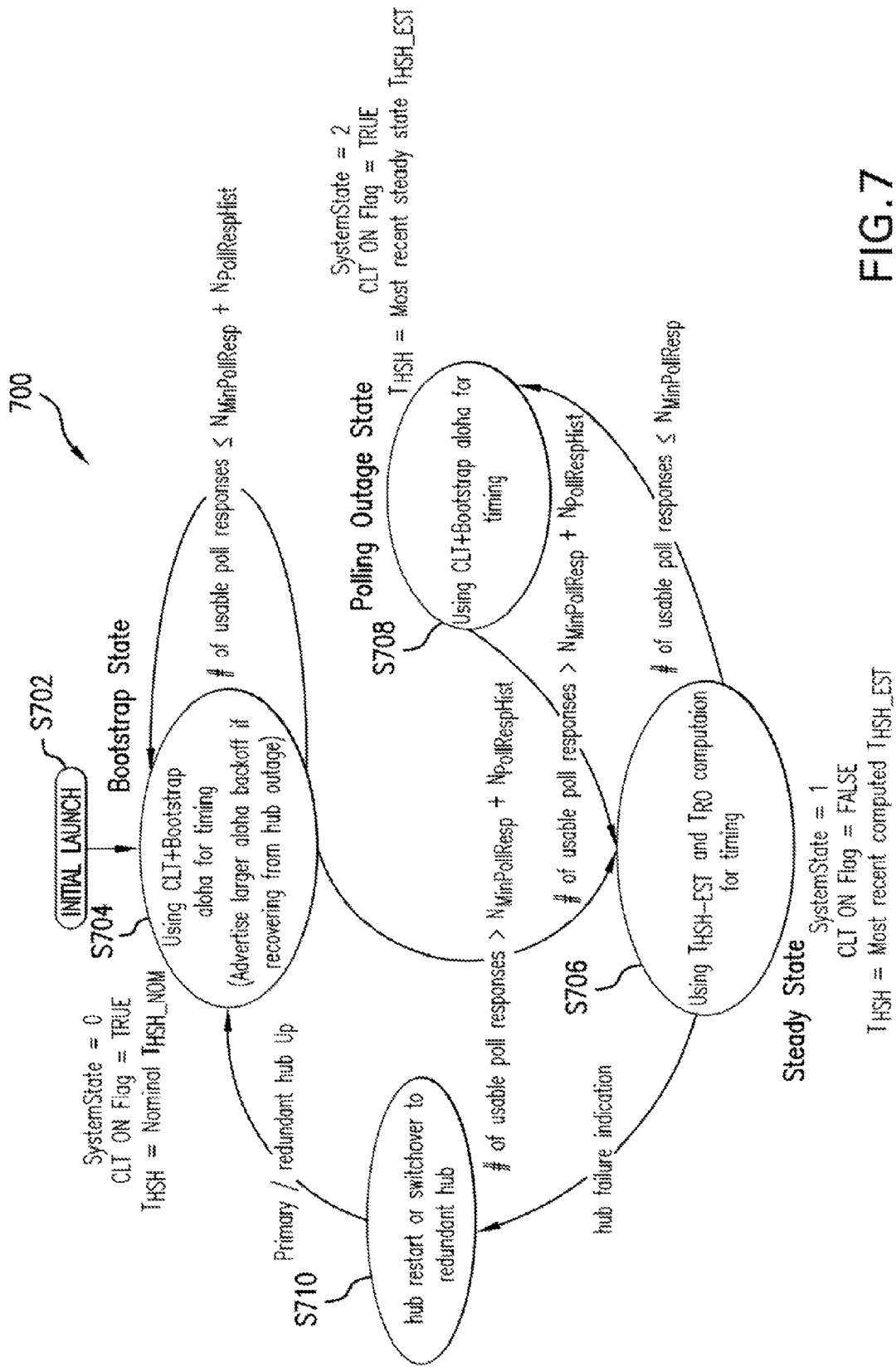
FIG. 7 illustrates a state diagram for the case of a remote offset time, $T_{RO}$, computation in steady state, in accordance with an aspect of the invention.

FIG. 7 illustrates a state diagram for the case of $T_{RO}$ computation in steady state, in accordance with an aspect of the invention.

As illustrated in the figure, a state diagram 700 includes an initial launch state S702, a bootstrap state S704, a steady state S706, a polling outage state S708 and a hub outage recovery state S710. Different states show the status of a "System state" field in SFNP, a flag "CLT_ON" and the value of $T_{HSH}$ in different scenarios. For the purposes of timing, the system can be considered to be in one of states as discussed below.

System is in bootstrap state (S704) during the initial launch period (S702) or it can transition to this state when it is recovering from a hub outage event (S710). The "System state" field in SFNP is set to 0 to indicate that the system is in bootstrap state (S704). CLT_ON flag is set to TRUE to indicate the use of CLT in bootstrap state (S704). The two scenarios under which the system is in bootstrap state (S704) are discussed below.

During the initial launch period (S702), the system does not have a large enough population of remotes to estimate satellite drift delay, which is needed to compute burst timing at the remotes. In other words, the number of usable poll responses is less than or equal to ($N_{MinPollResp}+N_{PollRespHist}$). Since remotes have no saved references, responses contain nominal values ($T_{HSH-NOM}$) that convey no drift delay information. Special procedures have to be used until a sufficient number of remotes are in the network. Subsequently, timing estimation process starts and the system transitions to steady state (S706).

In the event of a disabled hub, remotes are switched over to a redundant hub. When the redundant hub is up, the remotes have to establish synchronization with that hub. In the event the hub or a hub component (which controls timing) goes down and then restarts (for e.g., due to power interruption), the timing estimation process is interrupted, leading to a possible loss of synchronization between the hub and the remotes. In this case, there is no hub switchover to a redundant hub, since the primary hub has recovered. In either case, special procedures are needed to establish synchronization between the hub and the remotes. Once the timing estimation process has restarted, the system transitions to steady state (S706).

The procedure used for synchronization in both the scenarios is the same, based on a combination of bootstrap aloha and CLT. There is a difference due to the fact that during hub recovery, the number of remotes in the network is much larger than during initial launch. This means that the number of remotes contending for the limited number of aloha channels is much larger during hub recovery than during initial launch. To prevent a congestive collapse during hub recovery, the hub may advertise (in SFNP) a larger backoff to use with bootstrap aloha and temporarily increase the number of aloha channels by a significant value, until the system reaches steady state. This is the main difference between the two scenarios.

System transitions to steady state (S706) when a sufficient number of remotes are commissioned, ranged and active on the inroute. This means that in this state, at each polling time, the hub can find a set of active remotes which can be polled and receive a required minimum number of usable responses ($N_{MinPollResp}$) that can be used to estimate drift delay. In one embodiment, recommended minimum value for $N_{MinPollResp}$ is 10 and $N_{PollRespHist}$ is 100, as will be discussed in greater detail later. System state field in SFNP is set to 1 to indicate that the system is in steady state (S706). Also, the CLT_ON flag is set to FALSE in this state.

System may transition to polling outage state (S708) only from steady state (S706), when it is not able to maintain timing estimation due to an insufficient number of poll responses. When hub receives an insufficient number of responses to polling requests, the timing estimate ($T_{HSH-EST}$) cannot be computed to the accuracy required for remotes to time bursts to within a normal aperture. When the number of polling responses has increased above a threshold and the timing process has recovered, system transitions back to steady state (S706). Thresholds that control transition between steady state (S706) and polling outages states (S708) include hysteresis to prevent the system from thrashing (i.e., frequent switching) between these states. System state field in SFNP is set to 2 to indicate that the system is in polling outage state (S708).

While the system is in steady state, if there is an indication of hub failure, the system transitions to hub outage recovery state S710. The hub restart/switchover field is set indicating that a hub restart/switchover had occurred while the remote was powered off. In this case the system moves back to bootstrap state (S704) so that the remote saves a new set of references using bootstrap aloha. A new $T_{HSH}$ estimation process is started, which has no continuity with the $T_{HSH}$ estimation process on which the remote had saved its references. When the remote becomes active again, it needs a way to detect this event and reset its references based on the new $T_{HSH-EST}$ estimate. In one embodiment, this field can be a timestamp indicating the time at which the hub (re)start occurred. When a remote saves its references, it also saves the value of this field. At any time, if it finds a mismatch between its saved value and the value advertised in the SFNP, it declares that a (re)start has occurred and follows procedures to save new references as will be discussed in greater detail later.

System behavior in different states will be discussed in greater detail later.

Figure 8:
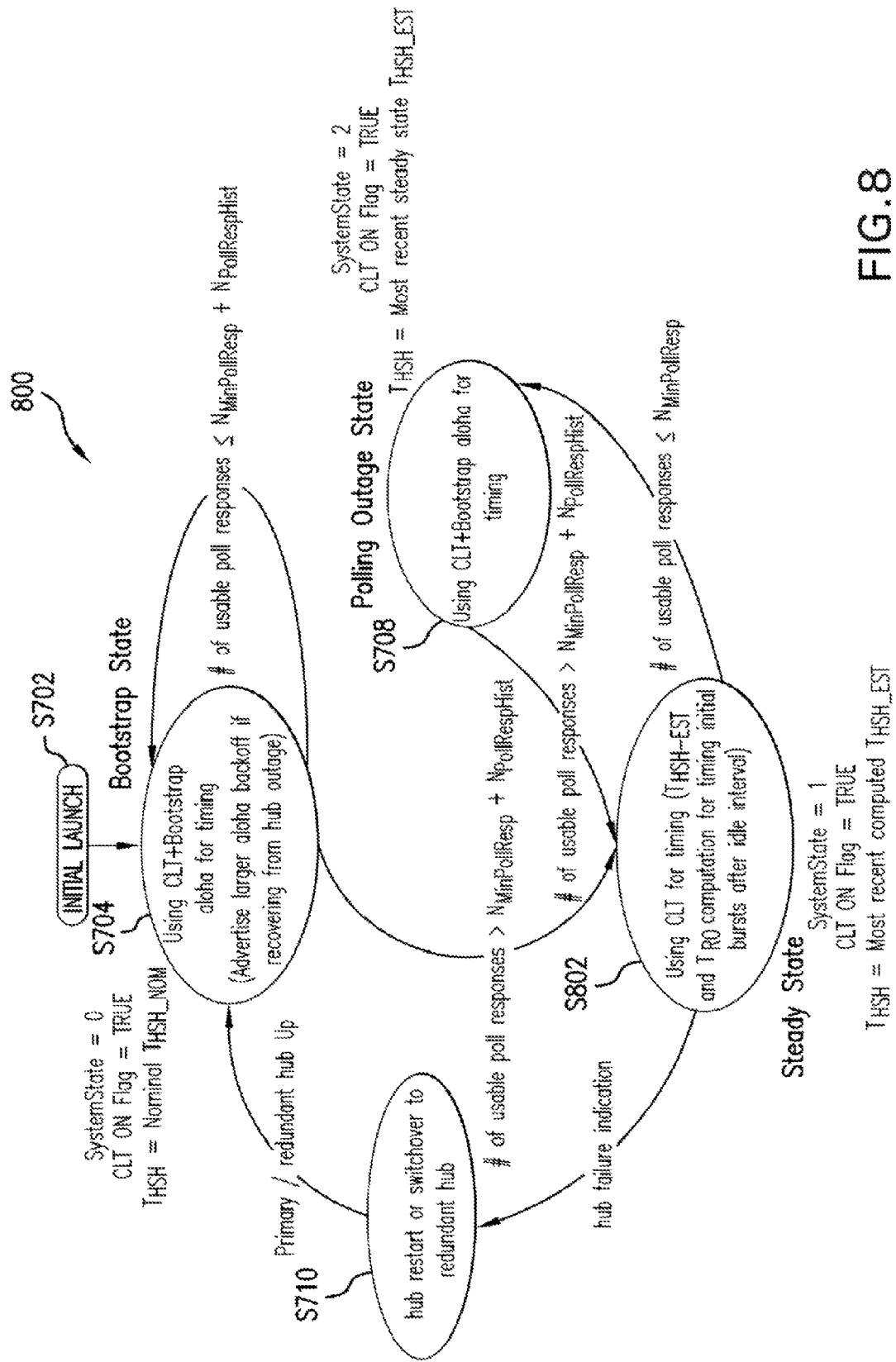
FIG. 8 illustrates a state diagram for the case of CLT in steady state, in accordance with an aspect of the invention.

The state transitions for the case of CLT in steady state is further explained with the help of FIG. 8.

FIG. 8 illustrates a state diagram for the case of CLT in steady state, in accordance with an aspect of the invention.

As illustrated in a state diagram 800, a steady state S802 uses CLT for timing while the transitions between initial launch state S702, bootstrap state S704, polling outage state S708 and hub outage recovery state S710 are same as state diagram 700.

If the CLT_ON field in SFNP is TRUE in steady state S802, CLT mechanism is used by the hub to broadcast corrections to each remote to correct their $T_{RO}$ values. Each remote receives timing feedback from the hub for every aloha burst (bootstrap or normal) and timing feedback during allocated traffic, whenever the timing error exceeds the CLT drift delay threshold. This allows the remote to correct its $T_{RO}$ immediately and maintain its accuracy for normal aperture bursts. CLT mechanism in accordance with aspects of the invention is described in detail later.

Figure 9:
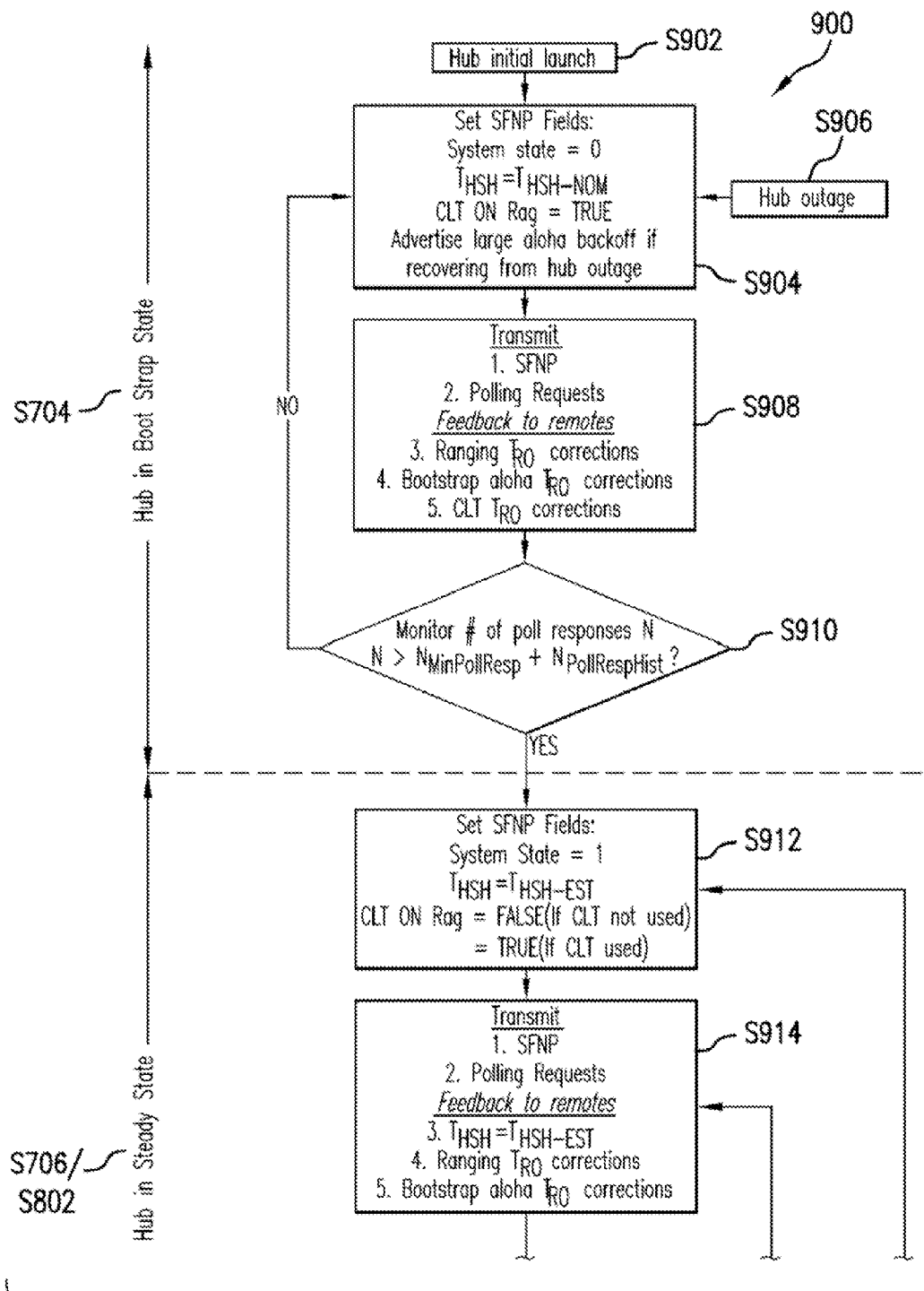
FIG. 9 illustrates a hub process flow diagram as the system transitions through different states, in accordance with an aspect of the invention.
Figures 1, 9:
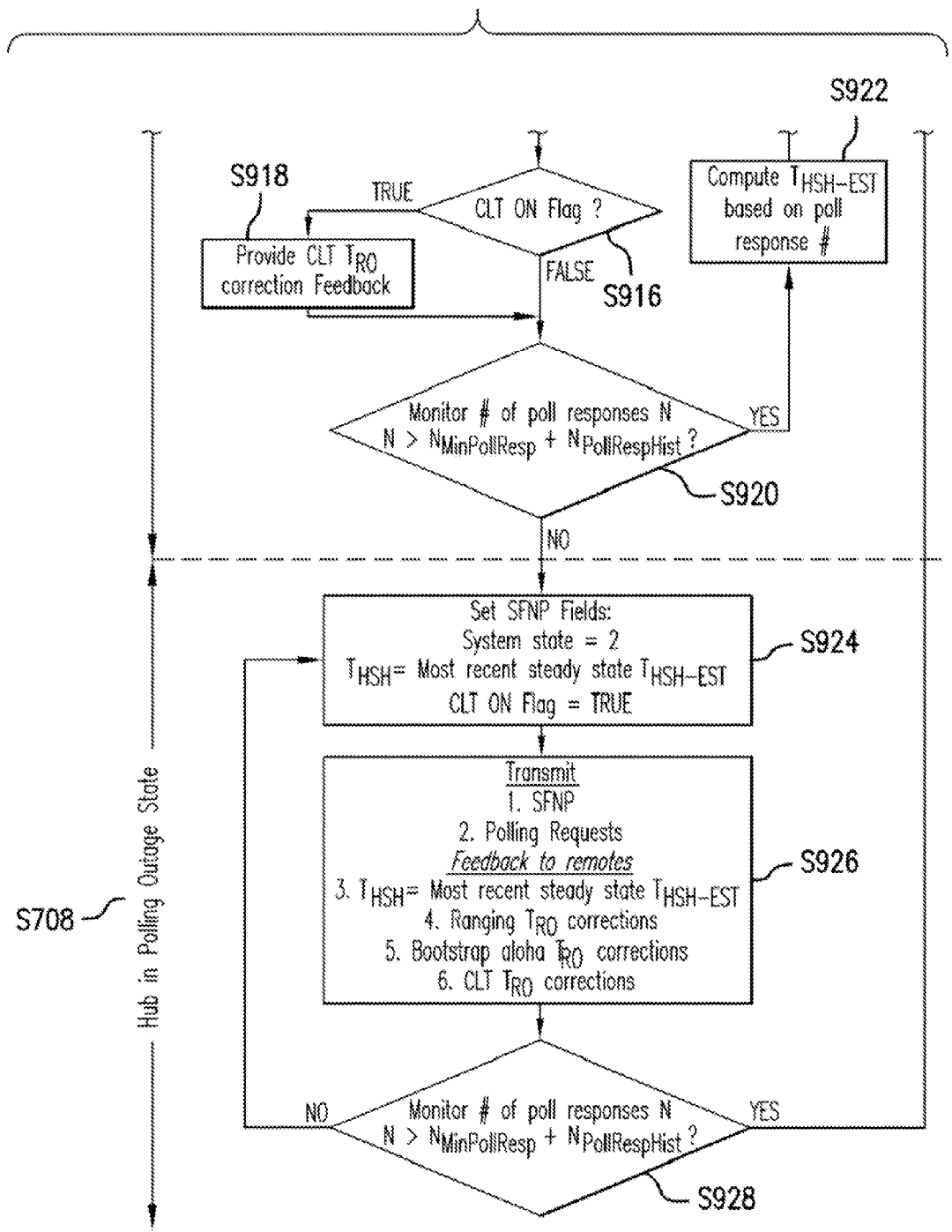

FIG. 9 illustrates a hub process flow diagram as the system transitions through different states, in accordance with an aspect of the invention.

As illustrated in the figure, a hub process flow diagram 900 corresponds to bootstrap state (S704), steady state (S706 or S802) and polling outage state (S708) of state diagrams 700 and 800. For purposes of discussion, from hereon, bootstrap state will be used for state (S704), steady state will be used for state (S706 or S802) and polling outage state will be used for state (S708).

After the hub initial launch (S902), system moves to a set up process (S904), which includes setting up the "System state" field in SFNP to 0 to indicate that the system is in bootstrap state and CLT_ON flag to TRUE to indicate the use of CLT in bootstrap state. A nominal value of $T_{HSH}$ ($T_{HSH-NOM}$) is used since there is no drift delay information available at launch state. If the system has moved to bootstrap state due to a hub outage (S906), advertise a larger aloha backoff so as not to overload the available aloha capacity in case a large number of remotes were present in the network at the hub outage.

In a transmit process (S908), hub transmits the SFNP and the polling requests. A CLT feedback and bootstrap aloha procedure are used for inroute timing. A newly installed remote follows ranging procedures to determine its $T_{RO}$. The hub transmits remote specific timing correction feedback messages ($T_{RO}$) on the outroute.

In a monitor process (S910), hub monitors the poll responses received from the remotes. If the number of poll responses exceeds a minimum ($N_{minPollResp}+N_{PollRespHist}$), system transitions to steady state. If the poll responses are not enough, the system stays in bootstrap state.

In steady state, a set up process (S912) includes setting up the "System state" field in SFNP to 1, CLT_ON flag to TRUE if CLT is used or to FALSE if CLT is not used. $T_{HSH}$ in SFNP is based on the $T_{HSH-EST}$ computed from polling responses.

In a transmit process (S914), hub transmits the SFNP and the polling requests. Newly installed remotes use ranging to obtain initial inroute timing synchronization. The hub computes a $T_{HSH-EST}$ based on the drift delays received from polling.

If CLT_ON flag is TRUE (S916), hub provides CLT $T_{RO}$ correction feedback (S918) to remotes. If CLT_ON flag is FALSE, $T_{RO}$ correction is based on $T_{HSH-EST}$.

If number of poll responses (S920) exceed a minimum ($N_{minPollResp}+N_{PollRespHist}$), the hub computes $T_{HSH-EST}$ based on the poll responses (S922), which is transmitted to the remotes in the SFNP. If the poll responses are not enough, the system transitions to the polling outage state.

In polling outage state, a set up process (S912) includes setting up the "System state" field in SFNP to 2, CLT_ON flag to TRUE and $T_{HSH}$ in SFNP is based on the most recent steady state $T_{HSH-EST}$ value.

In a transmit process (S926), hub transmits the SFNP and the polling requests. Newly installed remotes use ranging to obtain initial inroute timing synchronization. The hub computes a $T_{HSH-EST}$ based on the most recently computed $T_{HSH-EST}$ value when the system was last in steady state. The system reverts to CLT and boot strap aloha for inroute timing and the bootstrap aloha $T_{RO}$ corrections and CLT $T_{RO}$ corrections are performed.

If number of poll responses (S928) exceed a minimum ($N_{MinPollResp}+N_{PollRespHist}$), the system goes back to the steady state. If the poll responses are not enough, the system continues in the polling outage state.

Remote's behavior as the system transitions through different states is discussed below with the help of FIG. 10

Figure 10:
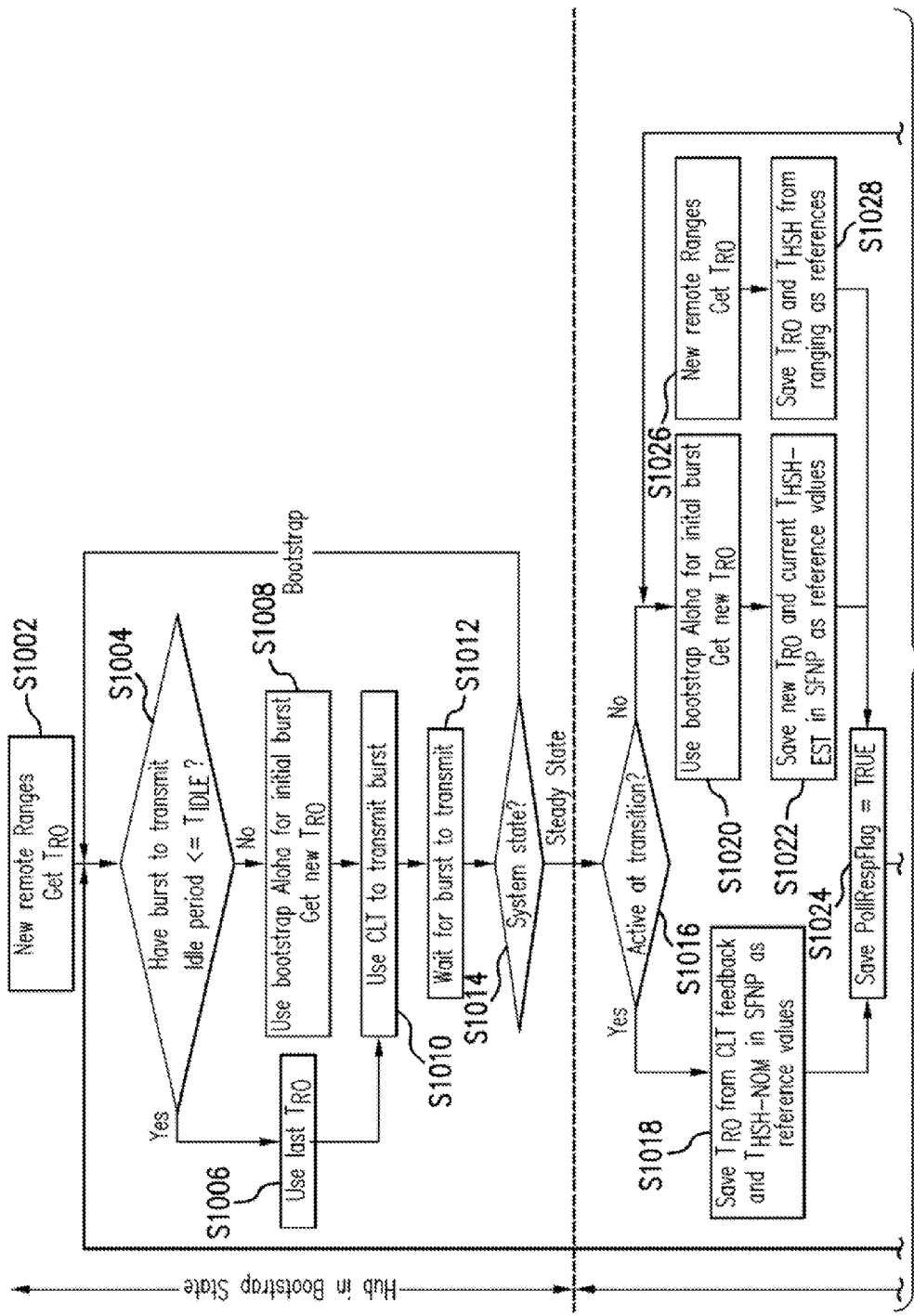
FIG. 10 illustrates a remote process flow diagram as the system transitions through different states, in accordance with an aspect of the invention.
Figures 1, 10:
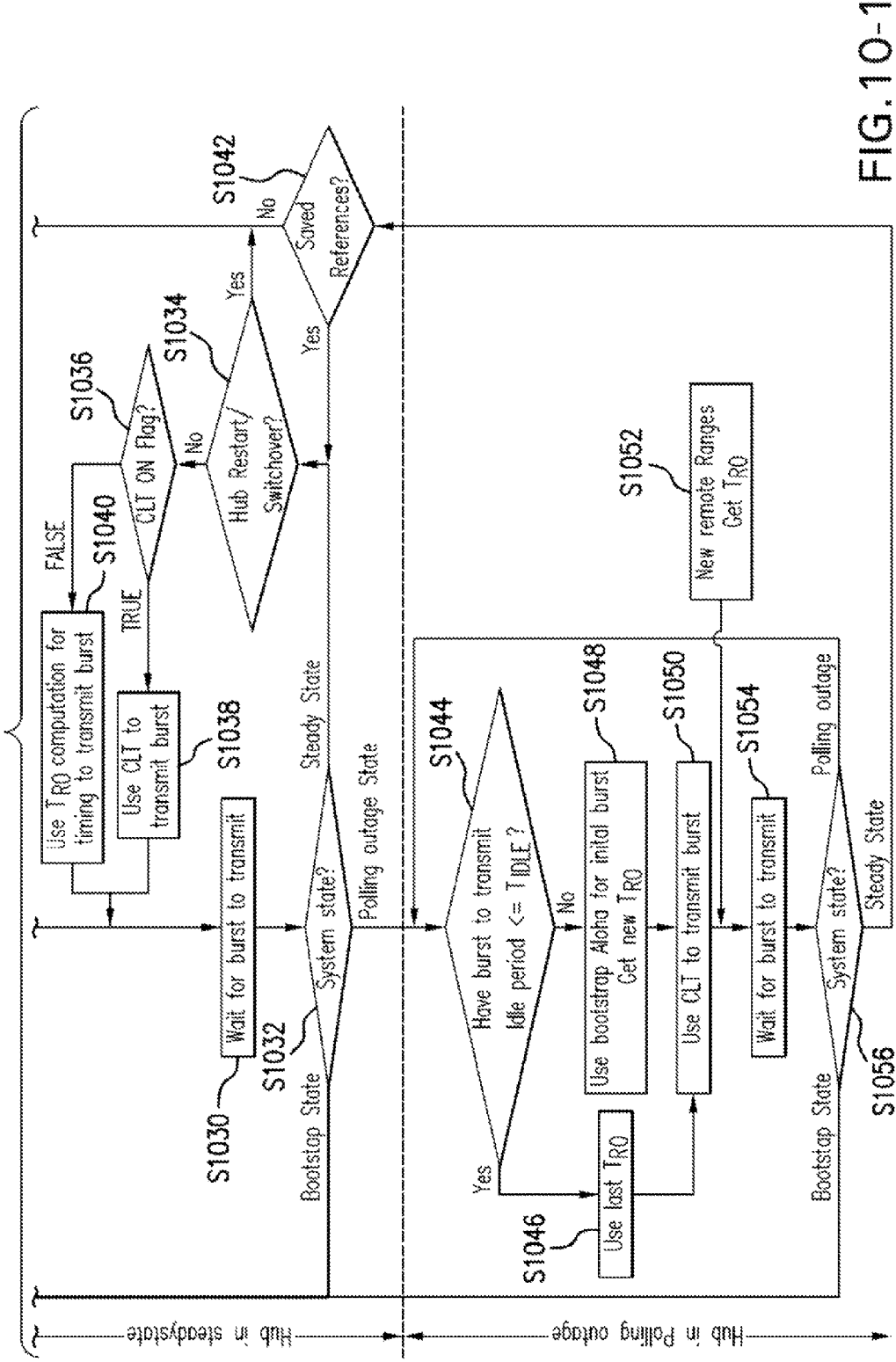

FIG. 10 illustrates a remote process flow diagram as the system transitions through different states, in accordance with an aspect of the invention.

As illustrated in the diagram, a remote process flow 1000 corresponds to hub in boot strap state, hub in steady state and hub in polling outage state of state diagrams 700 and 800.

A newly installed remote may go through ranging procedure to acquire timing information to enter the network (S1002). A remote is considered "active" at any time if it currently has pending bandwidth requests or if it is transmitting. Such a remote may be selected for polling by the hub and if so, it responds to the polling requests. If a remote does not have bandwidth requests or allocations (i.e., not transmitting), but is not powered off, it is considered an "idle" remote. Such a remote is capable of receiving the outroute, and can receive polling requests. If no more than $T_{IDLE}$ seconds have elapsed since the last correction (S1004), an idle remote may use its previously corrected $T_{RO}$ value (S1006) to transmit its next burst. If the idle period is more than $T_{IDLE}$ seconds, the bootstrap Aloha procedure is used for initial burst and a new $T_{RO}$ value is received (S1008). If CLT is being used, an idle remote may use its previously corrected $T_{RO}$ value (S1006) to transmit its next burst (S1010). After that time, it has lost synchronization and may resynchronize before it can transmit again (S1012). If polled, an idle remote provides polling responses on contention channels. Finally, a remote may be "powered off", in which case it cannot communicate on the network (S1014).

If the remote is active at the time of transition (S1016) from bootstrap or polling outage state to steady state, the remote saves reference (S1018) at the transition. A newly installed remote goes through ranging procedure to acquire timing information to enter the network (S1026). If the system is in steady state at the time of ranging, the timing values obtained during ranging are saved as references and used for timing bursts on the inroute (S1028). If the remote was idle or powered off at the time of transition, the bootstrap Aloha procedure is used for initial burst and a new $T_{RO}$ value is received (S1020). In this case, the remote saves its new its $T_{RO}$ value and current $T_{HSH-EST}$ value in the SFNP as references (S1022).

Once the remote has saved timing references, the polling response flag is set to TRUE (S1024) and the remotes waits to transmit the burst (S1030). If the system is not in steady state (S1032), it goes back to the bootstrap state (S1004) or it goes to polling outage state (S1044). If the system is in steady state (S1032), and the hub has not restarted or switched over (S1034), the remote uses the inroute timing mechanism as indicated by the hub in the CLT ON field in the SFNP (S1036). If this flag is false, $T_{RO}$ computation mechanism is used (S1040). If this flag is TRUE, CLT mechanism is used (S1038). If CLT is being used, remote receives timing feedback to every Aloha burst (bootstrap or normal) and timing feedback during allocated traffic whenever the timing error exceeds the CLT drift delay threshold as will be discussed in greater detail later. If $T_{RO}$ computation is being used, timing feedback is received only for bootstrap aloha bursts; timing feedbacks are not received for normal aloha or stream bursts. In this case, the remote computes its timing based on its saved references and the $T_{HSH-EST}$ value in the SFNP.

If the system is in bootstrap or polling outage state, the remote relies on CLT and bootstrap aloha. In polling outage stage, the remote follows the same actions as shown in bootstrap state (S1004-S1014). If the remote has been idle for less than $T_{IDLE}$ seconds (S1044), it may use its last $T_{RO}$ value (S1046) to transmit its next burst. If the idle period is more than $T_{IDLE}$ seconds, the bootstrap Aloha procedure is used for initial burst and a new $T_{RO}$ value is received (S1048). If CLT is being used, an idle remote may use its last $T_{RO}$ value (S1046) to transmit its next burst (S1050). A newly installed remote goes through ranging procedure to acquire timing information to enter the network (S1052). The remote waits to transmit the burst (S1054) and the state of the system is checked (S1056) to see if it is in bootstrap state, steady state or polling outage state.

If system is in steady state and the remote has not saved references (S1042), it will save them when it first transmits in steady state using a bootstrap aloha procedure.

$T_{RO}$ computation via $T_{HSH}$ estimation is used when the system is in steady state, regardless of whether the system is using CLT or $T_{RO}$ computation for timing. If CLT is used, $T_{RO}$ computation is used only for the initial burst after an idle interval. If CLT is not used, initial as well as subsequent bursts are timed based on computed $T_{RO}$. No timing correction messages (such as CLT feedback) need to be provided from the hub for the operation of this technique.

$T_{RO}$ computation via $T_{HSH}$ estimation technique uses the following actions, which are discussed in detail later: 1) an ongoing process of hub periodically polling a select group of remotes; 2) a $T_{HSH}$ estimation procedure at the hub based on polling responses; 3) broadcast of the estimated $T_{HSH}$ as part of the SFNP message from the hub; and 4) computation of $T_{RO}$ at the remote based on this $T_{HSH}$ estimate and remote's saved reference values.

At initial launch, the system starts in the bootstrap state during which it uses bootstrap aloha/CLT for timing. It then follows certain procedures to transition to steady state, and switches to $T_{RO}$ computation for timing. Under exceptional conditions, the system may transition from steady state to a polling outage state or back to bootstrap state. In these states, bootstrap aloha/CLT are used for timing. After recovery is complete, the system again transitions back to steady state.

The hub has a very accurate time reference, which is used to determine when each new superframe starts. The hub tries to transmit the SFNP at exactly the start of every superframe. However, because of processing delays in the hub and because the DVB-S2 outroute transport packets are not synchronized with the hub's frame timing, the hub cannot transmit the SFNP at exactly the right time. The SFNP is always transmitted a little bit later than the "ideal," time tick. In addition, the amount of time that the SFNP is delayed from the ideal time varies slightly with each SFNP transmission. Further, this delay is different for different outroute streams. Variation in SFNP transmission time is further explained with the help of FIG. 11.

Figure 11:
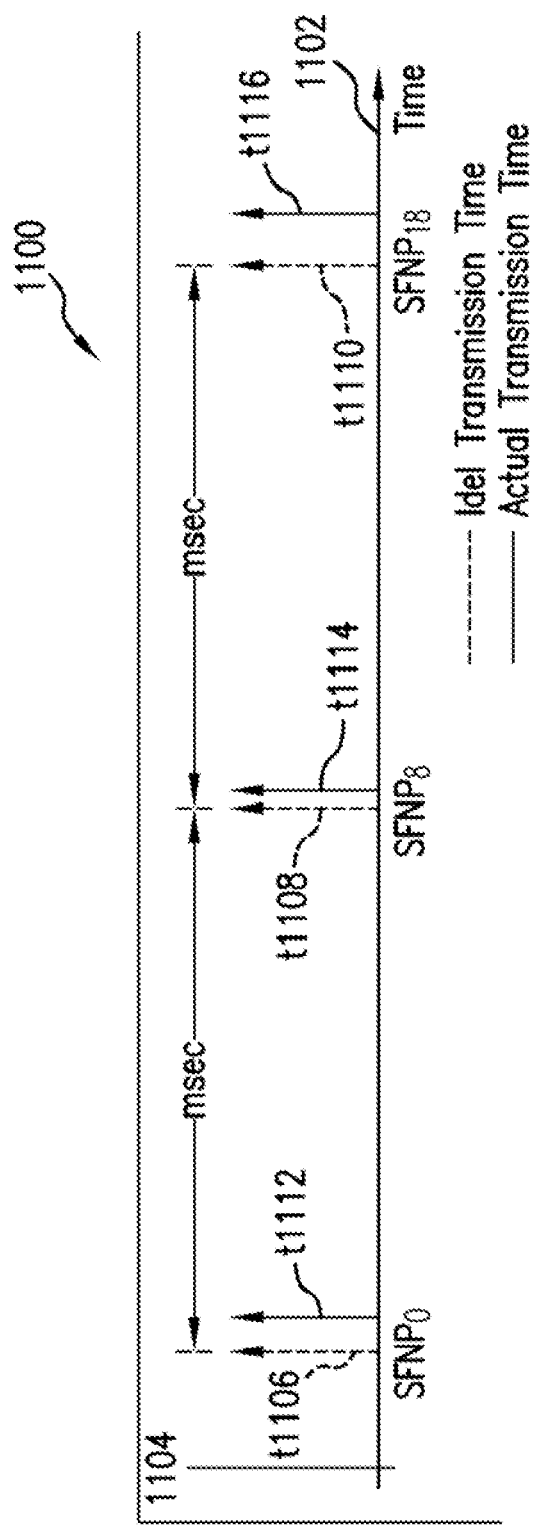
FIG. 11 illustrates an embodiment of the variation in SFNP transmission time in accordance with an aspect of the invention.

FIG. 11 illustrates an embodiment of the variation in SFNP transmission time in accordance with an aspect of the invention.

As illustrated in the figure, an x-axis 1102 denotes the timeline for SFNP transmission times. Times $t_{1106}$, $t_{1108}$, and $t_{110}$ represent the ideal transmission times for $SFNP_0$, $SFNP_8$ and $SFNP_{16}$ respectively. Times $t_{1112}$, $t_{1114}$, and $t_{1116}$ represent the actual transmission times for $SFNP_0$, $SFNP_8$ and $SFNP_{16}$ respectively.

Although the delay and delay variation are small compared to $T_{SF}$, they are large compared to the accuracy that the remotes need to synchronize their timing with the hub timing. To allow remotes to correct for this variation, which occurs each time the hub transmits an SFNP, hub measures the time delay between the "ideal" time when the SFNP should have been transmitted (the start of the superframe) and the time when it was actually transmitted. This delay is also broadcast in the next SFNP packet's local SFNP Delay field. Each SFNP contains the time that the previous SFNP was delayed from its "ideal" transmission time. The remotes subtract this value from the time at which they received the previous SFNP to determine when it would have been received, if the hub could have sent it at exactly the right time. This is the reference point that a remote uses for its inroute frame timing calculations. This is further explained with the help of FIG. 12.

Figure 12:
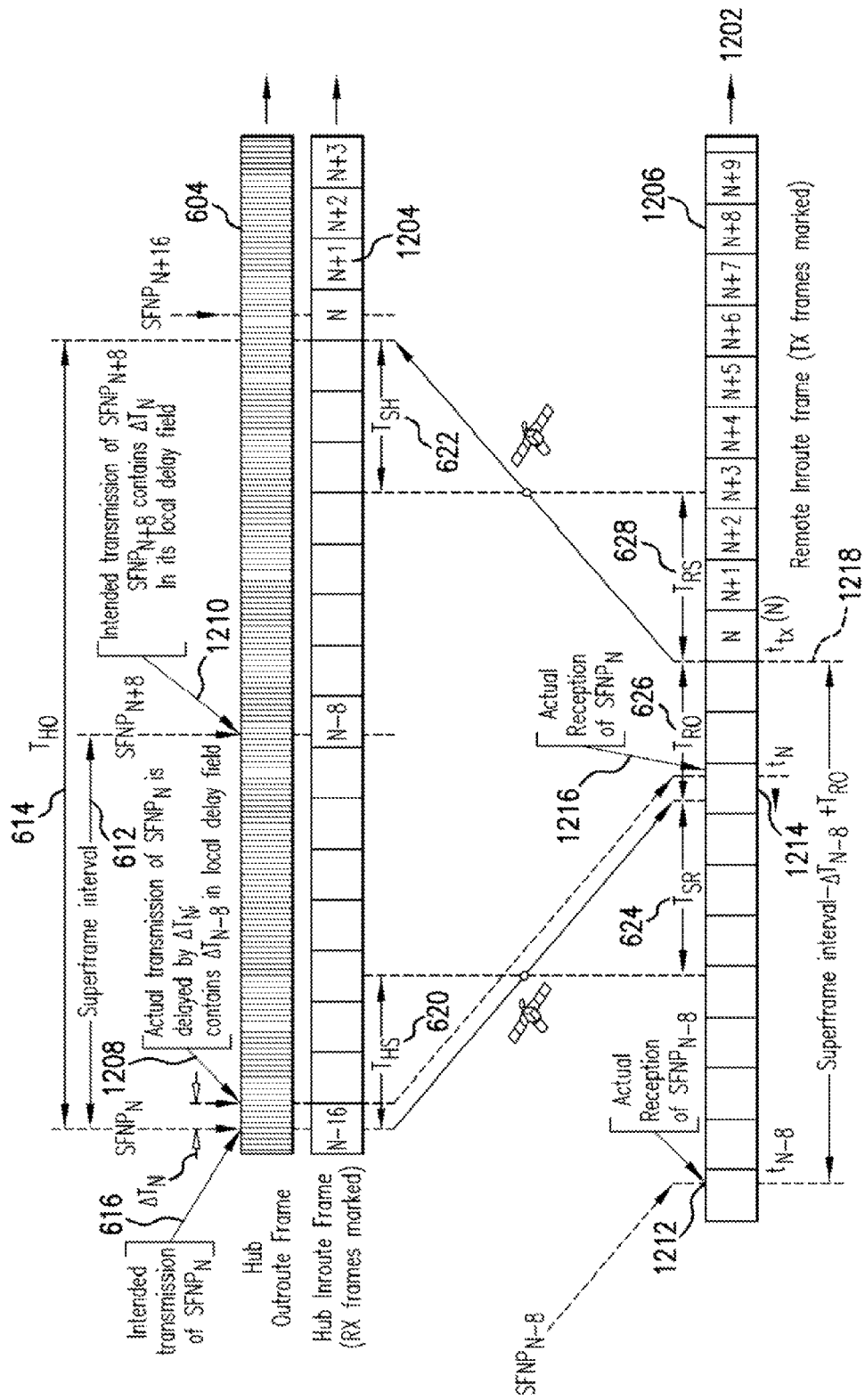
FIG. 12 illustrates an embodiment of the timing relationship between the remote and the hub with compensation for delay in SFNP transmission, in accordance with an aspect of the invention.

FIG. 12 illustrates an embodiment of the timing relationship between the remote and the hub with compensation for delay in SFNP transmission, in accordance with an aspect of the invention.

As illustrated in the figure, an inroute time axis 1202 is divided in to slots, frames and superframes, similar to FIG. 6. A remote inroute frame 1202 and a hub inroute frame 1204 represent the timing relationship with SFNP local delay taken in to account. SFNP local delay is the delay between the intended and actual times of SFNP transmission at the hub. The local $SFNP_{N-M}$ delay is measured at the hub and transmitted as part of the $SFNP_N$ to allow the remote to compensate for the local delay in the transmission of $SFNP_{N-M}$, where M is the number of frames/superframe.

Time 616 indicates the time for intended transmission of $SFNP_N$ while a time 1208 indicates the actual transmission of $SFNP_N$, where the delay is denoted by $\Delta T_N$. Note that $SFNP_N$ contain $\Delta T_{N-8}$ in its local delay field. A time 1210 indicates the intended transmission of $SFNP_{N+8}$, where $SFNP_{N+8}$ contain $\Delta T_N$ in its local delay field. Note that a time 1214 indicates the intended reception of $SFNP_N$ based on the intended transmission of $SFNP_N$ at time 616.

Let $t_{N-8}$ and $t_N$ denote the actual times of reception of $SFNP_{N-8}$ and $SFNP_N$ at a time 1212 and a time 1216 on time axis 1202 respectively for remote m. When the remote receives the $SFNP_N$, it obtains the local delay that occurred in the transmission of $SFNP_{N-8}$ (i.e., $\Delta T_{N-8}$), which is contained in the local delay field of $SFNP_N$. Also, let $T_{HSH\text{-}EST}(t_N)$ denote the estimated $T_{HSH}$ value contained in the $SFNP_N$. With this information, the remote can calculate the time at which it should transmit the burst, in order for the burst to be received at the hub exactly at the start of inroute frame N, as follows:

$$t_{tx}(N) = t_{N-8} - \Delta T_{N-8} + T_{SF} + \hat{T}_{RO}(m, t_N) \quad (3)$$

where the estimated $T_{RO}$ is computed by, $$\hat{T}_{RO}(m, t_N) = T_{RO\text{-}REF}(m) + 2(T_{HSH\text{-}REF}(M) - T_{HSH\text{-}EST}(t_N)) \quad (4)$$

and $T_{RO\text{-}REF}(m)$ and $T_{HSH\text{-}REF}(m)$ are the reference values saved by the remote m.

Hub cannot control the timing of the SFNP transmission so that it occurs in the same position within the outroute frame in successive transmissions. Consequently, the position of the SFNP within the outroute frame is variable, depending on when the SFNP is available for transmission and the lengths of other packets in the queue. Moreover, hub has the knowledge of which outroute frame contains the SFNP, but cannot measure the exact time at which SFNP transmission actually occurred within that outroute frame. To overcome this issue, hub measures the local delay with respect to a fixed reference point within the frame containing the SFNP, rather than with respect to its actual position in the frame. The remote then uses the same reference point to measure the time of arrival of the SFNP. For example, hub can measure the local delay with respect to the start of the transmitted outroute frame containing the SFNP. If the remote also measures the time of arrival to the start of the received outroute frame containing the SFNP, local delay correction is consistent between the hub and remote. This is further explained with the help of FIG. 13.

Figure 13:
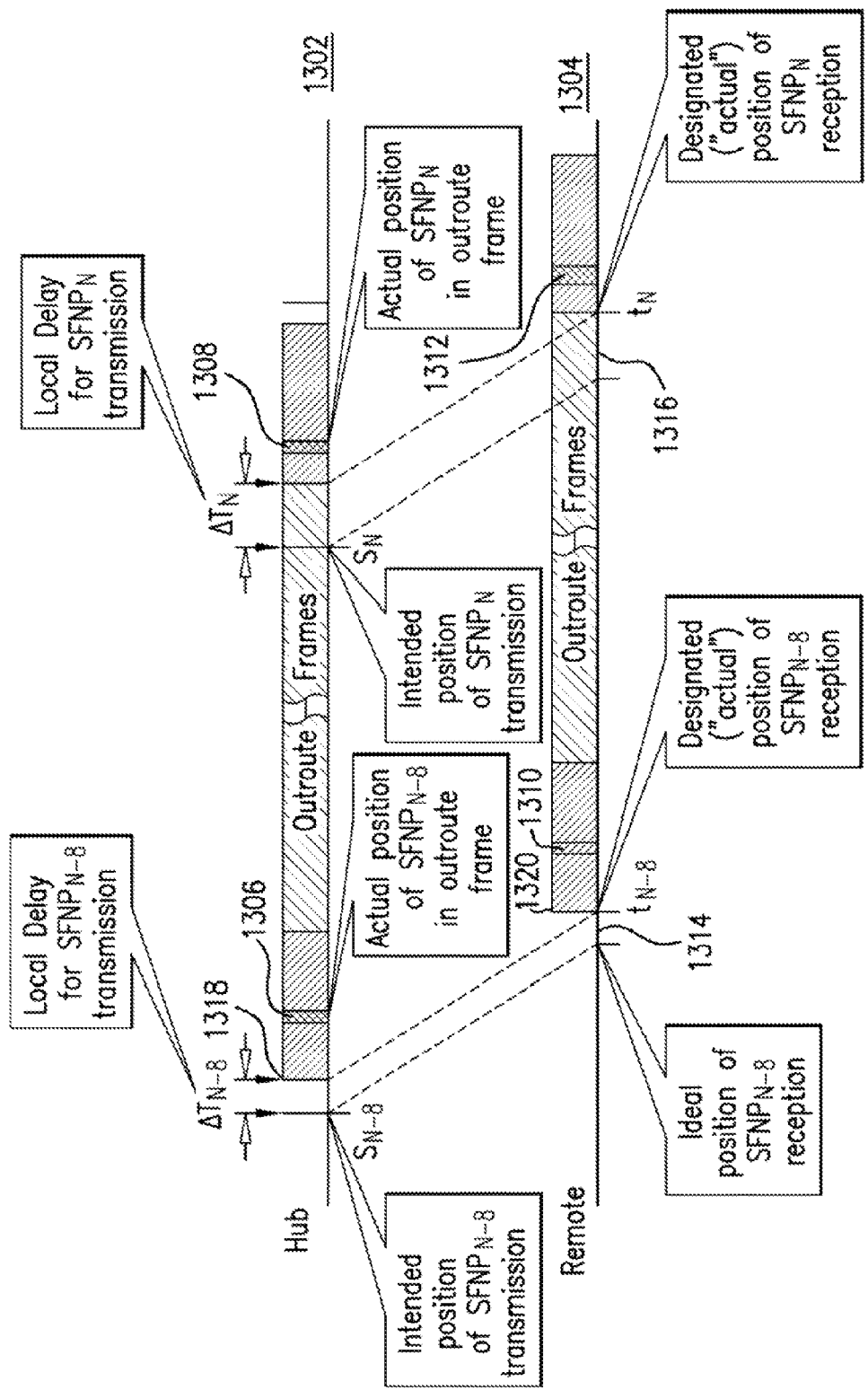
FIG. 13 illustrates an embodiment of SFNP local delay measurement in accordance with an aspect of the invention.

FIG. 13 illustrates an embodiment of SFNP local delay measurement in accordance with an aspect of the invention.

As illustrated in the figure, an x-axis 1302 represents time axis at the hub and an x-axis 1304 represents time axis at the remote.

As discussed above, $\Delta T_{N-8}$ indicates local delay for $SFNP_{N-8}$ transmission and $\Delta T_N$ indicates local delay for $SFNP_N$ transmission on the hub side. Similarly, a time difference 1314 indicates the local delay for $SFNP_{N-8}$ reception and a time difference 1316 indicates the local delay for $SFNP_N$ reception on the remote side. A location 1306 indicates actual position of $SFNP_{N-8}$ in transmitted outroute frame and a location 1310 indicates actual position of $SFNP_N$ in transmitted outroute frame. Similarly, a location 1312 indicates actual position of $SFNP_{N-8}$ in received outroute frame and a location 1308 indicates actual position of $SFNP_N$ in received outroute frame.

Instead of measuring the position of transmitted $SFNP_{N-8}$ at 1306, hub measures the local delay with respect to a fixed reference point within the frame containing the SFNP, for example, start of the transmitted outroute frame containing the SFNP at position 1318. Similarly, instead of measuring the position of received $SFNP_{N-8}$ at 1310, remote measures the time of arrival with respect to a fixed reference point within the frame containing the SFNP, for example, start of the time of arrival of the received outroute frame containing the SFNP at position 1320.

Therefore, hub measures the local delay with respect to a fixed reference point within the frame containing the SFNP, rather than with respect to its actual position in the frame. The remote then uses the same reference point to measure the time of arrival of the SFNP. Note that the reference point need not be the start of the outroute frame; it can be any point that is fixed in time relative to the start of the outroute frame.

Polling process is discussed next, in accordance with aspects of the invention.

The purpose of polling is to collect measurements of drift delay as measured by the remotes. The drift delay as seen from the location of the remote is measured by the remote as the difference between its saved reference $T_{RO}$ value and its current $T_{RO}$ value. This is the change in the hub-remote round trip delay since the time remote saved the reference values. This is approximate since the current $T_{RO}$ used by the remote may contain an error. Since the current $T_{RO}$ value is used to transmit the burst containing the poll response, the hub can measure this error by the aperture offset of the received burst and apply a correction, so that an accurate estimate of the drift delay as seen from the remote's geographic location is obtained.

In addition, the remote also sends the reference $T_{HSH}$ value, which it saved at the same time as the reference $T_{RO}$. By applying the drift delay as measured by the difference in reference and current $T_{RO}$ values to the reference $T_{HSH}$, the hub computes the current $T_{HSH\text{-}EST}$ for that remote. At any polling instant, by averaging the current per-remote $T_{HSH\text{-}EST}$ values across a number of remotes that are geographically distributed throughout the beam, a per-beam $T_{HSH\text{-}EST}$ is computed, which is then broadcast via the SFNP. Any remote can compute the average per-beam drift delay, since the time it saved its references, as the difference between this $T_{HSH\text{-}EST}$ and its reference $T_{HSH}$. The remote can then estimate its $T_{RO}$ based on its reference $T_{RO}$ and its computed drift delay. The accuracy of this $T_{RO}$ estimate (which translates to aperture length) depends on the accuracy of the polling process, i.e., the polling interval as well as the number and distribution of remotes providing poll responses. With a polling interval of the order of 100's of seconds and 5-10 responses from remotes randomly distributed in the beam, this $T_{RO}$ estimate is accurate enough to time bursts to within an aperture of the order of 10's of microseconds.

When system is in steady state, hub polls remotes periodically. Interval between polling requests ($T_{POLL}$) may not exceed a maximum value (for example, 100's sec). A smaller polling interval improves the accuracy of $T_{RO}$ computed at remotes and translates to a smaller aperture length. Just prior to each polling instant, hub selects a subset of remotes that are going to be granted bandwidth allocation and sends poll requests to this subset of remotes. Remotes send poll responses on allocated bandwidth via an adaptation field. The number of remotes selected for polling should be large enough to generate the required minimum number of usable poll responses, as will be discussed in greater detail later.

Some of the polled remotes may not respond or their responses may not be received in time for $T_{HSH\text{-}EST}$ computation. Some poll response values may be discarded as outliers. These considerations require that the number of remotes polled should be much larger than the required minimum number of usable responses ($N_{MinPollResp}$). However, in order to ensure that $N_{MinPollResp}$ usable responses are generated, hub has to poll a much larger number of remotes. If the number of available remotes or usable poll responses is smaller, hub cannot maintain the $T_{HSH}$ estimation process and has to enter the polling outage state. This is further explained with the help of FIG. 14.

Figure 14:
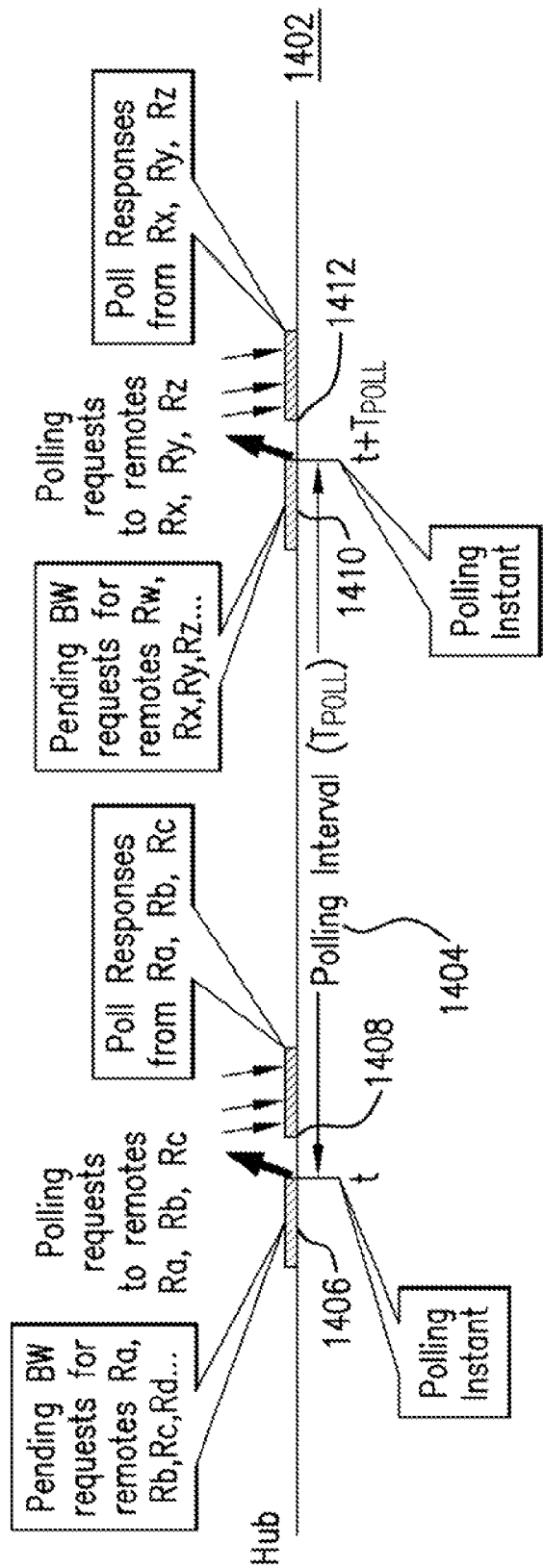
FIG. 14 illustrates an embodiment of the polling process at the hub in accordance with an aspect of the invention.

FIG. 14 illustrates an embodiment of the polling process at the hub in accordance with an aspect of the invention.

As illustrated in the figure, an x-axis 1402 represents time axis at the hub for polling process. A polling interval 1404 ($T_{POLL}$) indicates the interval between the two polling requests by the hub, namely a polling instant 1406 and another polling instant 1410.

Just prior to polling instant 1406 (time t), hub selects remotes $R_a$, $R_b$, $R_c$, and $R_d$, that are going to be granted bandwidth allocation and sends poll requests to these remotes. At time 1408, remotes $R_a$, $R_b$ and $R_c$ send poll responses on allocated bandwidth to the hub. After waiting for polling interval 1404 ($T_{POLL}$), hub sends another poll request at time 1410, which is equal to (t+$T_{POLL}$), to remotes $R_w$, $R_x$, $R_y$, and $R_z$ that are going to be granted bandwidth allocation. At time 1412, remotes $R_x$, $R_y$, and $R_z$ send poll responses on allocated bandwidth to the hub.

Note that some of the polled remotes may not respond (for example, remote $R_x$) or their response may not be received in time (for example, remote $R_d$) for $T_{HSH-EST}$ computation. Therefore, the number of remotes polled should be much larger than the required minimum number of usable responses ($N_{MinPollResp}$) in order to have sufficient number of responses to maintain the $T_{HSH}$ estimation process at the hub and avoid entering the polling outage state.

When the system is initially launched and is in bootstrap state or is in polling outage state, the number of active remotes (i.e., remotes with pending bandwidth requests at hub) available for polling is too small. In these cases also, the hub may use the approach described above: i.e., selectively poll remotes once a sufficient number becomes active on the system. Alternately, the hub may broadcast polling requests to all remotes in the beam. Idle remotes (i.e., remotes that do not have pending bandwidth requests, but are not powered off) can respond to polling requests via contention access. This is an alternative to selectively polling active remotes and may result in a quicker transition from bootstrap or polling outage to steady state.

If the system is in bootstrap state while recovering from hub outage, when the hub comes up, it will find a large number of active remotes in the network. The hub can selectively poll active remotes and transition out of the bootstrap state very quickly.

As a general rule, selective polling of active remotes is preferable whenever possible. Broadcast polling is an option that can be used to transition out of bootstrap or polling outage states, if the number of active remotes is small and a quick transition to steady state is desired. Transition to steady state is discussed in detail below.

The system transitions from bootstrap (initial launch or hub recovery) or polling outage states to steady state once the number of usable poll responses rises above a threshold. This threshold is set higher than the minimum required to provide hysteresis so that the system does not thrash between the two states.

When the system transitions from bootstrap to steady state, remotes that had responded to polling receive a $T_{RO}$ correction via CLT feedback from the hub. Hub may provide this feedback within seconds after transition, so that remotes can save references and by the time the next poll request is received, are ready to respond with saved references (in bootstrap after initial launch, since remotes have no saved references, responses contain nominal values that convey no drift delay information). These remotes save the current $T_{HSH-EST}$ value in the SFNP and the corrected $T_{RO}$ value as their "reference values" in their non-volatile memory when they see this transition. Once the system has transitioned to steady state, succeeding poll responses can be used to compute a $T_{HSH-EST}$ at the hub, which is transmitted via the SFNP and remotes use this information to compute $T_{RO}$ for timing. The process of saving references for different scenarios will be discussed in greater detail later.

$T_{HSH}$ estimation and $T_{RO}$ computation process has been simulated in one embodiment to determine the worst case error in the computed $T_{RO}$, with different number of poll responses and polling intervals. As expected, the worst case $T_{RO}$ error decreases with increasing number of responses and decreasing polling interval.

The threshold to transition to steady state is set much higher than this number since (i) some currently active remotes may be inactive at a future polling instant, (ii) a number of responses may get eliminated as 3-sigma outliers or because they are not geographically diverse, and (iii) thrashing between the two states is to be avoided. To account for these possibilities, hub transitions to steady state when the number of responses exceeds the threshold given by $N_{minPollResp}+N_{PollRespHist}$. A larger threshold is strongly recommended and makes the system more robust against polling outages. It is also essential that these responses are not concentrated in one part of the beam as discussed later.

The $T_{HSH}$ estimation and $T_{RO}$ computation process depends upon the remotes having saved a set of reference timing values in a controlled manner. Saving of references occurs infrequently during normal operation—at transitions from bootstrap or polling outage to steady state or as part of ranging or bootstrap aloha during steady state. No reference values are saved when the system is in bootstrap or polling outage states. The reference values are saved in remote's non-volatile memory. The reference values saved by remotes are discussed as below.

One of the reference values saved by the remote is the most recent corrected $T_{RO}$ value ($T_{RO-REF}$). Remote obtains this value by correcting its current $T_{RO}$ estimate by a $T_{RO}$ correction sent by the hub. Hub provides this correction via CLT feedback to polled remotes at transition from bootstrap to steady state or as part of ranging process or in response to bootstrap aloha.

The other reference value saved by the remote is the most recent $T_{HSH}$ received via the SFNP ($T_{HSH-REF}$). Hub broadcasts a $T_{HSH-EST}$ value in the SFNP. Remote saves the most recent $T_{HSH}$ value advertised immediately after saving its $T_{RO-REF}$ value. Note that since the hub advertises the nominal $T_{HSH}$ in the SFNP in the bootstrap state, this is the value that gets stored by remotes that save references at transition. In steady state, the value of $T_{HSH-EST}$ is updated after each polling interval to track satellite drift. So the value saved is dependent on the time at which the reference was saved. In addition, the remote also saves the status of PollRespFlag and Reference Version in nonvolatile memory as describe below.

PollRespFlag is initialized to FALSE when a remote is installed. In steady state or in polling outage state, a remote responds to a polling request only if this flag is TRUE (since it has valid saved references only if that is the case). However, when the system is in bootstrap state, a remote responds to polling regardless of the setting of this flag.

Reference Version identifies the current $T_{HSH}$ estimation process based on which the $T_{HSH-REF}$ was saved. The purpose of this information is to allow the remote to detect if the $T_{HSH}$ estimation process was restarted when the remote was powered off. A restart can occur in the case of a hub restart or switchover to a redundant hub. Remote compares this value against the Hub Restart/Switchover field in SFNP and detects if a restart/switchover has occurred. If it has, the remote has to save the references again. Otherwise it will not be able to maintain timing synchronization. The exact form of this information is not specified in this application.

A remote saves its references if and only if one or more of the following conditions are true:

Remote is installed and ranged in steady state (System state field value=1 in SFNP). In this case, it saves its references based on the $T_{RO}$ correction value received as part of the ranging procedure.

Remote sees System state field value change from 0 to 1 (bootstrap to steady state transition) in successive SFNP messages. It will save its references when it receives the next $T_{RO}$ correction from the hub. Note that the remote will save new references when this occurs, even if it has previously saved references.

Remote has not saved references, and it sees System state field value change from 2 to 1 (polling outage to steady state transition) in successive SFNP messages. This occurs if a new remote was installed during polling outage state and a transition takes place from polling outage to steady state. It will save its references when it receives the next $T_{RO}$ correction from the hub.

Remote has not saved references and it sees that the system is in steady state, i.e., System state field value in SFNP is 1 when it wants to transmit. This happens when a remote was installed in bootstrap state, was powered off during the transition to steady state, is powered on and becomes active when system is in steady state. It also happens if the remote was idle (i.e., was receiving the outroute and hence saw the transition, but was not transmitting on the inroute) during transition and becomes active when system is in steady state. It also happens when a remote is installed in polling outage state. In this case, the remote uses a bootstrap aloha for its initial burst to obtain a $T_{RO}$ correction and save references. Note that references can be saved only when a remote receives a $T_{RO}$ correction, and this will not occur until the remote transmits on the inroute.

A remote which was previously installed and ranged may be forced to re-range or follow bootstrap aloha procedure, based on a command from the hub. When this occurs in steady state (System state field value=1 in SFNP), it saves a new set of references based on the $T_{RO}$ correction value received as part of the procedure. Such a procedure is useful as a troubleshooting tool to deal with the corrupted reference values in the remote.

Note that in each of the above cases, the remote obtains the $T_{RO}$ correction from hub prior to saving references. Consequently, the saved $T_{RO-REF}$ value is always the corrected $T_{RO}$ value saved immediately after a timing correction obtained from the hub (due to ranging or bootstrap aloha or CLT feedback) has been applied. In all cases, the saved $T_{HSH-REF}$ value is the most recently advertised $T_{HSH-EST}$ value in the SFNP after the $T_{RO-REF}$ is saved.

In steady state, selected active remotes that are seeking and receiving inroute bandwidth allocation are polled by the hub. Polled remotes respond with certain reference time and differential time values (previously saved by these remotes). Remote may send its poll response within a 10's sec interval after the poll request is received. The response from the remotes may include the following: 1) the previously saved reference $T_{HSH}$: $T_{HSH-REF}$; 2) the difference between the most recent $T_{RO}$ (the $T_{RO}$ used in timing the burst containing the poll response) and the previously saved reference $T_{RO-REF}$:

$$\Delta T_{RO} = T_{RO} - T_{RO-REF} \quad (5)$$

3) PollRespFlag; and 4) information to determine the geographic spread of the poll responses: This can be in the form of the remote's current $T_{RO}$ value or the latitude and longitude of the remote (if available). Remote $T_{RO}$ values or latitude, longitude information are used by the hub to select responses from a geographically diverse subset of remotes as will be discussed in greater detail later.

In bootstrap and polling outage states also, the response consists of the same fields as indicated above. However, in bootstrap state, the $T_{HSH-REF}$ field contains the $T_{HSH}$ value that was received in the most recent SFNP (nominal $T_{HSH}$), and the other fields are set to 0.

In polling outage state, the responses may be from remotes with saved references, in which case all the above fields are set accordingly. Responses may also be from remotes installed during the polling outage state, in which case, the $T_{HSH}$ field contains the value that was received in the most recent SFNP; other fields are set to 0.

In some cases hub receives mixed polling responses, which are discussed below.

In polling outage state, hub may receive some responses from remotes that had previously set references in steady state (with poll responses containing PollRespFlag=1). The system is in polling outage since the number of such responses is smaller than needed. It can also receive responses from remotes newly installed in polling outage state, which have no saved references (with poll responses containing PollRespFlag=0). The latter group is transmitting nominal values in its response (e.g., $\Delta T_{RO}=0$, since they have not saved $T_{RO-REF}$). Clearly, responses from the two groups cannot be used together to compute $T_{HSH-EST}$. There are two options for the hub in this case as discussed below.

In one embodiment (option 1), hub can ignore the responses from the newly installed remotes and wait until the number of responses from remotes with saved references exceeds the threshold before transitioning to steady state. In this case, the $T_{HSH-EST}$ process is continuous with that prior to polling outage and is consistent with the references already saved by remotes in the network. This approach is preferable when the number of remotes in the network with saved references is larger than the number of newly installed remotes in polling outage state. Conversely, if the number of remote with saved references is small (possible in the case of small networks), this approach may prolong the duration of the polling outage state. In one embodiment, where the number of remotes is expected to be in tens of thousands/beam or higher, this is the recommended approach to dealing with mixed responses in polling outage state. The method presented in this application is based on this approach.

In another embodiment (option 2), hub can transition into steady state when the total number of responses from both groups exceeds the threshold. An active remote at this transition will save a new set of references, regardless of if it is a newly installed remote or a remote with previously saved references. (Remotes which are inactive at this transition, but had previously saved references, need to detect that they have to save new references when they become active again in steady state). Subsequent polling responses would be based on the new references, which start a new $T_{HSH-EST}$ process which is not consistent with the references saved by the remotes prior to polling outage. The hub uses the "GW restart/switchover identification" in the SFNP to advertise that a new $T_{HSH-EST}$ has started. Based on this, remotes with old references save their references again when they first become active in steady state (as if a hub restart had occurred). If the number of remotes with saved references is smaller than newly installed remotes in polling outage state, (possible in the case of small networks), this approach is preferable since it quickens the transition to steady state. On the other hand, in a network with a large number of remotes which had previously saved references, this is not an attractive option for the following reason: when such remotes become active again in steady state and find that they have to save new references, they will have to use bootstrap aloha to obtain $T_{RO}$ corrections. Bootstrap aloha uses unallocated contention slots and a large aperture and its use should be minimized.

In bootstrap state after hub restart/switch over also, mixed responses may be received by the hub. But hub can mix the responses in this case (as in case 2 above), since it will start a new $T_{HSH}$ estimation process anyway. In this case, all the remotes will save a new set of references (similar to case 2 above and with a large back-off for bootstrap aloha). In bootstrap state after initial launch, this issue is not encountered since none of the remotes have saved references.

Correction for timing error of the poll response burst at the hub in accordance with an aspect of the invention is discussed next.

Note that the $T_{RO}$ used in computing $\Delta T_{RO}$ in the poll response is the $T_{RO}$ computed by the remote for transmitting the burst containing the poll response. This $T_{RO}$ may contain an error. The hub will determine the timing error for this burst and apply a correction to the $\Delta T_{RO}$ to compensate for the timing error. In other words, the hub will correct the $\Delta T_{RO}$ so that it effectively becomes the difference between the ideal $T_{RO}$ (i.e., $T_{RO}$ that hits the center of the aperture) and the remote's reference $T_{RO\text{-}REF}$.

Geographic distribution of remotes in accordance with an aspect of the invention is discussed next.

Hub has to select a subset of responses from remotes distributed across the beam. If remote latitude and longitude coordinates were entered during installation, remotes send this information as part of the poll response. If this information is not available, each remote sends its current $T_{RO}$ as part of the poll response. The hub applies a correction to this $T_{RO}$ based on the aperture offset of the burst to determine the ideal $T_{RO}$ ($T_{RO\text{-}CORR}$) that would have resulted in the burst hitting the center of the aperture. This is described further on. Remotes located close to each other will have $T_{RO\text{-}CORR}$ values that are close to each other. Larger differences in the $T_{RO\text{-}CORR}$ values of remotes indicates that the remotes are further apart (the converse is not necessarily true). Hub can examine the distribution of the $T_{RO\text{-}CORR}$ values from the poll responses and select a subset that is distributed over a range.

A simple algorithm for this selection in accordance with an aspect of the invention can be outlined as follows: 1) let $T_{RO\text{-}MIN}$-$T_{RO\text{-}MAX}$ represent the range of all possible $T_{RO\text{-}CORR}$ values for a given beam. This range is known apriori for a given $T_{HO}$, beam and hub; 2) divide this range into $N_{TRO}$ segments. A value of $N_{TRO}$=5 is expected to be satisfactory in one embodiment; 3) for each segment, determine the number of poll responses whose $T_{RO\text{-}CORR}$ values fall within that segment; 4) find the smallest number $N_{min}$ across all the segments; 5) from each segment, randomly select $N_{min}$ responses whose $T_{RO\text{-}CORR}$ values were in that segment; and 6) this gives a total of $N_{min}*N_{TRO}$ poll responses that are considered geographically diverse enough for computing $T_{HSH\text{-}EST}$. This number should satisfy $N_{min}*N_{TRO}>N_{minPollResp}$, which can be ensured by polling a large number of remotes.

If remote latitude and longitude coordinates are available, the above algorithm can be used with some minor modifications in an example embodiment: 1) the beam is geographically divided into $N_{TRO}$ sectors; 2) remote responses are located within the sectors based on their latitude and longitude in their poll response; 3) for each sector, determine the number of remotes whose $T_{RO\text{-}CORR}$ values fall within that sector; 4) from each sector, randomly select $N_{min}$ responses whose $T_{RO\text{-}CORR}$ values were in that sector; and 5) this gives a total of $N_{min}*N_{TRO}$ poll responses that are considered geographically diverse enough for computing $T_{HSH\text{-}EST}$. This number should satisfy $N_{min}*N_{TRO}>N_{minPollResp}$, which can be ensured by polling a large number of remotes.

$T_{HSH}$ estimation at the hub in accordance with an aspect of the invention is discussed next.

Reference values from the subset of poll responses are used at the hub to compute an estimated $T_{HSH}$ value that is broadcast as part of the SFNP. In one embodiment, each hub maintains a separate $T_{HSH}$ estimate each of its four beams (per-beam $T_{HSH}$ estimation). This approach provides significant reductions in aperture in comparison to per-hub or system wide $T_{HSH}$ estimation.

Note that this procedure is applicable only when the system is in steady state i.e., the system has gone through a bootstrap state and there are remotes in the network that have set their references and respond to polling.

The hub ignores responses from remotes with PollResp-Flag set to FALSE. This can happen when the system is in bootstrap state (when no remote has saved references) or in polling outage state (if a remote is installed during the polling outage state). Only responses with PollRespFlag=TRUE are used in $T_{HSH}$ estimation.

This procedure is used to compute $T_{HSH\text{-}EST}$ only if the hub receives a sufficient number of usable responses ($>N_{MinPollResp}$, see action 5 below). The case when this number is insufficient is discussed later.

The $T_{HSH}$ estimation algorithm in an example embodiment can be described by the following five actions.

First are preliminary actions. The hub maintains and updates a $T_{HSH\text{-}EST}$ (according to actions 2-5 below) for each beam and broadcasts this estimate $T_{HSH\text{-}EST}$ in the SFNP for the remotes in that beam. Each active remote receives this information. Further, the remotes have saved "reference" $T_{HSH}$ and $T_{RO}$ values. The $k^{th}$ remote saves its references at $t_{REF}(k)$ as: i) the $T_{HSH}$ value that was broadcast in SFNP closest to $t_{REF}(k)$ as $T_{HSH\_REF}(k)$; and ii) the $T_{RO}$ value at $t_{REF}(k)$ as $T_{RO\text{-}REF}(k)$.

For a second action, at a time t, the hub polls remotes within each beam. For purposes of discussion, let N of the remotes in the polled group happen to be active and provide a feedback to the hub. The feedback from the $k^{th}$ remote in the polled group includes:

a) $T_{HSH\text{-}REF}(k)$; and b) $\Delta T_{RO}(k,t)=T_{RO}(k,t)-T_{RO\text{-}REF}(k)$, where $T_{RO}(k,t)$ is the $T_{RO}$ computed by the $k^{th}$ remote for the transmission of the burst containing the poll response.

For a third action, for purposes of discussion, assume the burst used to send this poll response arrives at the hub at an offset of $T_{off}(k,t)$ relative to the center of the aperture. Hub can compute a corrected $\Delta T_{RO}$ (i.e., the $\Delta T_{RO}$ that would have resulted, had the remote used the ideal $\Delta T_{RO}$ that hit the center of the aperture) as $$\Delta T_{RO\text{-}CORR}(k,t)=\Delta T_{RO}(k,t)+T_{off}(k,t) \quad (6)$$

For a fourth action, the $\Delta T_{RO}$ of equation (6) is a result of the satellite drift as seen by the $k^{th}$ polled remote between times t and $t_{REF}(k)$. The hub applies this as a correction to the $T_{HSH-REF}(k)$ value reported by the $k^{th}$ remote to compute $$T_{HSH-CORR}(k,t) = T_{HSH-REF}(k) - 0.5 * \Delta T_{RO-CORR}(k,t) \quad (7)$$

For a fourth action, the per-remote $T_{HSH}$ estimate is averaged across a subset of the remotes that responded to polling to obtain the current estimate $T_{HSH-EST}(t)$ for that beam:

$$T_{HSH\_EST}(t) = \frac{1}{N'} \sum_{k=1}^{N'} T_{HSH_{CORR}}(k,t) \quad (8)$$

Here N' is the number of remotes in the subset which were selected such that (1) there is some geographic diversity, as described earlier and (2) whose $T_{HSH-CORR}(k,t)$ is inside 3-sigma limits. Outlier samples that lie outside 3-sigma limits are excluded for better estimation accuracy. Further, the number of remaining samples after outliers are excluded (N') may exceed a certain minimum number ($N_{MinPollResp}$) to ensure that the estimate is acceptable. If this number is too small, the $T_{HSH}$ estimate is not updated (i.e., $T_{HSH-EST}(t)$ remains the same). This exceptional case will be discussed in greater detail later.

The resulting $T_{HSH}$ estimate is broadcast in the SFNP within the beam until the next polling event occurs and actions 2-5 are repeated.

$T_{RO}$ Computation at the remote based on $T_{HSH-EST}$ in SFNP in accordance with an aspect of the invention is discussed next.

If the system is in steady state and CLT is disabled, a remote that wishes to transmit a burst, determines its timing by computing a $T_{RO}$ using the $T_{HSH-EST}$ from the most recent SFNP and its saved reference values. If the system is in steady state and CLT is enabled, $T_{RO}$ computation is used, but only for the initial aloha burst more than $T_{IDLE}$ seconds have elapsed since the last CLT correction. Note that in order to use the $T_{RO}$ computation technique, a remote may have saved its reference values. $T_{RO}$ computation is summarized by the following action.

Assuming that an arbitrary remote m needs to determine the timing for its next burst at time t, and it has saved its references. This may be an active remote with stream (allocated) traffic or a remote coming out of a long idle state which needs to compute timing for its initial aloha burst. The $T_{HSH-EST}(t)$ contained in the most recent SFNP is obtained and used to estimate the $T_{RO}$ by:

$$\hat{T}_{RO}(m,t) = T_{RO-REF} 2(T_{HSH-REF}(m) - T_{HSH-EST}(t)) \quad (9)$$

This $T_{RO}$ value is used by the remote to determine the start-of-frame (SoF) time for frame number N contained in the SFNP. This estimated $\hat{T}_{RO}$ differs from the exact $T_{RO}$ for the remote (i.e., the value that would result in the remote's burst hitting the aperture center) by an error component. This error is due to the fact that the drift delay applied to $T_{RO-REF}$ in the above equation is a per-beam average drift delay, which is different from the drift delay as seen by that particular remote. The maximum value of this error determines the size of the aperture needed to receive the burst at the hub.

System enters polling outage state due to an inadequate number of usable poll responses. The case of inadequate number of poll responses is discussed next in accordance with an aspect of the invention.

The $T_{HSH}$ estimation process and hence the $T_{RO}$ computation approach depends critically on receiving poll responses from remotes that have saved their references. Some remotes save references at transition from bootstrap state. Others save references in steady state via ranging or bootstrap aloha. Any remote that has saved references can be polled and its response used in computing $T_{HSH-EST}$ (i.e., it is not restricted to remotes that saved references at transition). Under normal conditions in steady state, the number of poll responses easily exceeds the minimum needed ($N_{MinPollResp}$), since the minimum needed is quite modest, when compared to the number of remotes in a beam. However, under unusual conditions, such as a widespread regional power outage, it is possible that the number of poll responses falls below this minimum and $T_{HSH-EST}$ cannot be computed. If a new $T_{HSH-EST}$ is not computed at the end of a polling interval, the drift delay during the interval cannot be tracked. The possible error in the estimated $T_{RO}$ increases and the burst may not be received within the normal aperture.

When the number of usable polling responses (N') is too small ($0 < N' \leq N_{minPollResp}$), the hub transitions to polling outage state. In this state, remotes use bootstrap aloha to achieve initial synchronization and CLT during stream transmissions. Hub continues to poll remotes and monitor responses in polling outage state. However, the value of $T_{HSH-EST}$ is not updated and it remains frozen at the last value computed in steady state. System will transition to steady state once the number of polling responses N' is greater than $N_{MinPollResp} + N_{PollRespHist}$.

System enters polling outage state due to an inadequate number of usable poll responses. This state is indicated to remotes by setting the System state field=2 in SFNP. While similar to bootstrap state in most respects, there are also some differences. Similarities are the following. First the hub provides timing feedback to every Aloha burst and CLT feedback during allocated traffic whenever the timing error exceeds the CLT drift delay threshold as described later. CLT is enabled by setting CLT ON flag in SFNP to TRUE and by configuring the CLT Drift Threshold=$T_d$, which is <0.5*aperture length for CLT in one embodiment. Second, the remotes use bootstrap aloha if more than $T_{IDLE}$ seconds have elapsed since the previous $T_{RO}$ correction from hub. Third, the system will transition out of this state when it receives an adequate number ($>N_{MinPollResp} + N_{PollRespHist}$) of responses to polling requests.

Differences are: 1) the hub continues to transmit in the SFNP the most recent $T_{HSH-EST}$ computed in steady state (this will be referred to as the "frozen $T_{HSH-EST}$" in the following); and 2) the transition to steady state occurs only after:
a) an adequate number of usable poll responses are received, $$N' > N_{MinPollResp} + N_{PollRespHist} \quad (10)$$

and b) a new $T_{HSH-EST}$ is computed based on these responses and broadcast on the SFNP.

For example, the System state field in SFNP should switch from 2 to 1 only when the new $T_{HSH-EST}$ has been computed and advertised in the SFNP. This is very important since remotes that were installed during polling outage state and are active during the transition to steady state will save the $T_{HSH}$ in the SFNP at the time of transition as a reference. So this reference may be the value computed from the polled responses, not the frozen $T_{HSH}$ EST value transmitted during the polling outage state. This is necessary to maintain continuity in the $T_{HSH-EST}$ advertised in the SFNP before and after the system went into polling outage. Since the poll responses were computed based on remotes that had saved references prior to polling outage, the new $T_{HSH-EST}$ will be consistent with the $T_{HSH-EST}$ prior to outage and will incorporate the satellite drift that occurred during the outage interval.

As discussed earlier, the above approach to exiting polling outage is based on continuing the $T_{HSH-EST}$ process that was present in the steady state before polling outage occurred instead of reestablishing a new set of references (for example, option 1 instead of option 2 as discussed earlier). If option 2 is implemented, the transition to steady state is faster, but all the remotes with saved references will have to save references again, mostly via bootstrap aloha. In this case however, the polling outage state becomes identical to bootstrap state in the case of hub restart or switchover.

CLT in accordance with an aspect of the invention is discussed in detail below.

When the system is in bootstrap state, active remotes rely on CLT feedback to receive corrections to their $T_{RO}$ from the hub. A normal aperture can be used at the hub to receive these bursts.

When the system is in steady state, either the $T_{RO}$ computation mechanism described earlier or the CLT mechanism described below can be used. Hub can activate CLT by setting the CLT drift threshold $T_d$<0.5*aperture length and advertise to remotes to use CLT by setting the CLT ON flag in SFNP to TRUE. Note that only one (of CLT or $T_{RO}$ computation) can be in use at a time should be used. When system switches between the two methods, the remote detects this change based on the CLT ON flag in SFNP. After switching from CLT to $T_{RO}$ computation, remote may ignore any CLT feedback packets that may be received.

For aloha traffic, if CLT is active, hub provides a timing correction feedback as part of its response to every aloha burst from a remote. Such bursts can be for user data, PEP backbone keep-alive messages, and responses to SNMP polling request or BW requests. This allows the remote to correct its $T_{RO}$ immediately and maintain its accuracy for normal aperture bursts. If CLT is not active, hub provides a timing correction feedback only to ranging or bootstrap aloha bursts from a remote. Hub does not provide a timing correction feedback to normal aloha bursts.

For stream traffic, if CLT is active, remotes that are actively transmitting stream traffic receive consolidated CLT messages from the hub to correct their $T_{RO}$ estimates. In this case, a timing correction message may not be sent to each individual remote immediately, but is aggregated over multiple frames and remotes to prevent excessive outroute bandwidth usage. It can be summarized as follows. First, the remote transmits a stream burst on its allocated bandwidth, based on its current $T_{RO}$ estimate. Then the hub monitors the timing error for bursts from each remote (i.e., the difference between the center of the aperture and the last symbol of the unique word (UW)). Then, if at least $T_{HO}$ sec has elapsed since the last timing correction message to this remote and the timing error exceeds a configurable drift delay threshold (as a percentage of the aperture length), the hub adds the remote to its list of remotes that need to receive a timing correction feedback. Then a consolidated CLT correction message is sent to the remotes on this list if at least one of the following two conditions are satisfied: a) number of remotes on the list exceeds a certain minimum number; and/or b) a timing correction message is pending for remote on the list for more than a certain number of frames. Then the remote receives the CLT correction message, and makes the correction to its $T_{RO}$. Finally, when a remote wants to transmit a burst and it had received a timing correction within the last≤$T_{IDLE}$ seconds, it will use the most recent corrected $T_{RO}$ to time its burst. However, if >$T_{IDLE}$ seconds have elapsed since the last timing correction, the most recent corrected $T_{RO}$ is not usable. The remote has lost synchronization. If the system is in steady state, the remote has to use $T_{RO}$ computation for its initial burst. It the system is in bootstrap or polling outage states, it has to use bootstrap aloha for its initial burst, as will be discussed in greater detail later. After the hub sends a correction in response to the initial burst, CLT can be resumed.

As evident from the above, CLT is a mechanism to maintain timing synchronization once a remote has achieved synchronization. It does not provide a mechanism to achieve initial synchronization, for e.g., if the remote has been idle or power off for a long period (no $T_{RO}$ corrections from hub for >$T_{IDLE}$ seconds) and has lost timing synchronization. In this case, satellite drift during the idle period will make the most recent $T_{RO}$ from CLT too inaccurate to time the burst within a normal aperture.

In the steady state, the remote uses $T_{RO}$ computation based on the $T_{HSH-EST}$ in the SFNP and its stored references to compute initial timing. In the bootstrap state, it uses bootstrap aloha. Bootstrap Aloha for special cases is discussed next, in accordance with an aspect of the invention.

Bootstrap aloha is a mechanism used in bootstrap state, polling outage state or under exceptional cases in steady state. One example of a special case is when the system is in bootstrap or polling outage state, hub is providing CLT feedback, but the remote has not received a CLT timing correction feedback for >$T_{IDLE}$ and hence cannot use its previous $T_{RO}$ for its initial burst. In another example, system is in steady state, but the remote has not saved references. Hence it cannot compute timing via $T_{RO}$ computation. This can happen if the remote was ranged in bootstrap state, but was powered off during transition to steady state.

Bootstrap aloha is an aloha burst sent on an unallocated ranging channel. Its burst contents are similar to those of an unallocated ranging burst. The hub will include a timing correction feedback in the aloha acknowledgement message. Remote transmits the bootstrap aloha burst using a coarse $T_{RO}$ estimate based on $T_{HSH-EST}$ in the SFNP (which can be satellite CoB based), and remote zip code (as for ranging bursts). Hence this burst requires the use of a long aperture. The timing feedback received in response allows the remote to correct its $T_{RO}$ for normal aperture bursts.

Usage of bootstrap aloha is limited to cases when no other alternatives exist. Since the network is configured with very few unallocated ranging slots, it can be overloaded if numerous remotes are becoming active after their idle periods at the same time and resort to bootstrap aloha.

An example embodiment, when the remote recovers from a long idle and the system is in bootstrap and polling outage state is discussed below.

When the system is in bootstrap state, the remotes have not saved their references. Further, the SFNP contains a coarse $T_{HSH}$ based on satellite CoB coordinates. When the system is in polling outage state, newly installed remotes in polling outage state have not saved their references. In this state, SFNP contains the most recent $T_{HSH-EST}$ computed before entering polling outage state. An active remote will receive CLT corrections to $T_{RO}$ and can maintain frame timing. If it received a timing correction within the last≤$T_{IDLE}$ seconds, it can still use the most recent $T_{RO}$ when it comes out of idle state. The normal aperture is sized to tolerate drift delay over an interval up to $T_{IDLE}$. The hub can use normal aperture to receive such bursts. If the timing correction is older (received>$T_{IDLE}$ seconds ago), it cannot use the previous $T_{RO}$. In this case, the remote may use bootstrap aloha to reenter the network.

An example embodiment, when the remote recovers from a long idle and the system is in steady state is discussed below.

A remote may be installed and ranged in bootstrap or polling outage state, but may be idle or powered off when the transition to steady state occurs. Such a remote has not saved its references and hence cannot compute an accurate $T_{RO}$ when it becomes active. If a remote enters active state during steady state and finds that it does not have saved references (remote's PollRespFlag=FALSE), then it will use bootstrap aloha to send the first burst. This remote sets references after receiving correction in the bootstrap aloha acknowledgement. Subsequently, it can use the steady state $T_{HSH}$ estimate in the SFNP and its saved references to determine $T_{RO}$ values according to the procedure described later.

An example embodiment of ranging for newly installed remotes is discussed below.

A new remote may be installed and ranged in steady state. Such a remote saves its ranging values as reference values. The reference values saved are $T_{HSH-REF}$ and $T_{RO-REF}$ as described earlier. In addition, PollRespFlag is set to TRUE so that it can respond to polling requests. Subsequently, it can use the $T_{HSH}$ estimate in the SFNP to determine the $T_{RO}$ value to time its bursts (if CLT is disabled) or use CLT feedback (if CLT is enabled).

A newly installed remote follows ranging procedures to determine its $T_{RO}$. Ranging procedure consists of the following actions in accordance with an aspect of the invention, however, the procedure below is modified such that ranging allocations are not used for timing; hub provides the ranging timing correction in response to transmission on unallocated ranging slots:

Outroute frequency and timing acquisition
Inroute frequency synchronization
Superframe synchronization: This allows the remote to receive the SFNP. This in turn allows the remote to acquire inroute frame number synchronization and the value of the $T_{HSH}$ estimate being advertised by the hub.
Remote computes an approximate satellite-to-remote delay ($T_{SR-ZC}$), by approximating the remote location by its zip code coordinates and satellite location as the center of the station keeping box ($T_{HSH-NOM}$). From this, a coarse $T_{RO}$ is computed by:

$$T_{RO}=T_{HO}-T_{HSH-NOM}-2T_{SR-ZC} \quad (11)$$

Remote uses the coarse $T_{RO}$ to transmit a "ranging aloha burst" on an unallocated ranging channel.
The hub employs a "long aperture" to receive this burst, since it is based on a coarse $T_{RO}$. This aperture is also known as "ranging aperture" and is of the order of msecs. This is in contrast to the "normal aperture" which is tens of μsec wide that the hub uses for assigned data bursts and aloha bursts from remotes that have already ranged and saved references.
Hub measures the time interval between the start of the aperture and the time of arrival of the ranging aloha burst from the remote. This correction is sent to the remote as part of the aloha response.
Remote uses this to correct its coarse $T_{RO}$. This corrected $T_{RO}$ allows the remote to time its bursts so that they can be received using the much narrower normal aperture at the hub.

Two example embodiments for handling of hub outage are discussed next. In one embodiment, a hub or a component in the hub that controls timing may go down and restart. This implies that there is a loss of information related to hub states or the state of the $T_{HSH}$ estimation process. In another embodiment, a hub may be disabled and a redundant hub takes over the beams that were served by the disabled hub.

Both the above cases are handled the same way: the restarted primary hub or redundant hub starts in bootstrap state (System state field=0 in SFNP). When remotes see that the system is in bootstrap state, they rely on a combination of bootstrap aloha and CLT for timing. Since a large number of remotes are likely to be present in the network and contending for the limited number of unallocated aloha channels, a large aloha back off is advertised in the SFNP so that remotes accessing the inroute via bootstrap aloha do not overload the available aloha capacity. Once a sufficient number of remotes have entered the network and polling and $T_{HSH}$ estimation processes have started, the system transitions from bootstrap state to steady state using the procedures described earlier. Note that since a new $T_{HSH}$ estimation process is started, remotes which had previously saved references have to save new references. A comparison of its saved Reference version value against the hub restart/switchover identification field in SFNP indicates to a remote if a hub switchover/restart has occurred while it were powered off. Upon detection of this event, the remote saves a new set of references using bootstrap aloha.

The broad concepts underlying the inroute timing mechanisms in accordance with aspects of the invention are summarized by the actions as discussed below.

When the system is initially launched, it starts in a bootstrap state and transitions to steady state when a $T_{HSH}$ estimation procedure can be initiated. In bootstrap state, a CLT feedback and bootstrap aloha procedure are used for inroute timing. In steady state, $T_{RO}$ computation at the remotes is used for inroute timing.

Starting at the launch of the system, the hub transmits a SFNP on each unicast DVB-S2 stream of each outroute carrier to each of its beams. SFNP provides an inroute frame number for frame number synchronization, a $T_{HSH}$ value for inroute timing, System state field to indicate if the system is in a bootstrap state, polling outage or steady state, CLT On flag to indicate if the system is using CLT or a $T_{RO}$ computation mechanism Starting at system launch, the hub transmits polling requests at intervals not exceeding a certain interval (for example, 100's sec). Poll requests may be multicast to a specific group of remotes or broadcast to all remotes in the beam.

Initially, in bootstrap state, the number of poll responses will be small. It increases as new remotes are installed. When the number of responses exceeds a minimum, the system transitions to steady state.

Newly installed remotes use ranging to obtain initial inroute timing synchronization.

Remotes save certain reference timing values to aid the hub in computing a $T_{HSH}$ value. Remotes installed in a bootstrap state and that are active at bootstrap—steady state transition, save references at transition. Remotes installed in a steady state, save these references based on values received at ranging. Remotes that were installed in bootstrap but did not save references at transition, save their references based on values received after a bootstrap aloha procedure when they first become active in a steady state Remotes respond to polling requests from the hub by transmitting saved reference and differential delay values. These values report the satellite drift delay (between the time at which references were saved and the time of poll response) as seen by each of the polled remotes.

The hub computes a $T_{HSH-EST}$ based on the drift delay values received from polling. This $T_{HSH-EST}$ is broadcast as the $T_{HSH}$ value in the SFNP. This value contains the average drift delay seen by the group of remotes that responded to polling. In order that this average drift delay is representative of the (polled or non-polled) remotes in the beam, it is important to have a certain minimum number of responses to each polling request and some degree of geographic diversity in poll responses.

During steady state, timing may be based on either CLT or $T_{RO}$ computation, a choice that is controlled by the hub. CLT can be deactivated by configuring a drift delay threshold such that timing correction messages are not trigged at the hub. In this case, CLT ON Flag is set to FALSE in SFNP, to advertise to remotes that they should use the $T_{RO}$ computation. CLT can be reactivated by suitably reconfiguring the drift delay threshold $T_d$ and setting CLT ON Flag=TRUE in SFNP. The decision to use CLT or $T_{RO}$ is primarily driven by the complexity of implementation.

In steady state, if a $T_{RO}$ computation is used (i.e., CLT is deactivated), a remote that has to transmit a burst computes its $T_{RO}$ based on the $T_{HSH-EST}$ from the SFNP and its saved reference values. Note that the $T_{RO}$ computation at the remote does not require any timing feedback messages from the hub.

In steady state, if CLT is being used, the hub provides $T_{RO}$ corrections to remotes when the aperture offset exceeds a drift delay threshold $T_d$. If more than a predetermined $T_{IDLE}$ seconds have elapsed since the previous correction, remote uses $T_{RO}$ computation to transmit its first burst and resumes CLT based corrections.

If the number of poll responses is smaller than the minimum needed, the system enters polling outage state, during which it reverts to CLT and boot strap aloha for inroute timing. It reenters steady state when the number of responses again exceeds a threshold that exceeds the minimum by a number to provide hysteresis.

For ranging or bootstrap aloha, the hub uses a relatively long aperture. A non-limiting example of a relatively long aperture is in msec.

For CLT, the hub uses a normal aperture of tens of µsec. CLT is used during bootstrap and polling outage states and may also be used during steady state.

For timing based on $T_{RO}$ computation, the hub uses a normal aperture of 10's of µsec. $T_{RO}$ computation may be used only during steady state.

If a hub that is currently serving a set of beams is disabled, remotes in the four beams associated with it may be switched over to one of the redundant hubs, which starts in a bootstrap state. If a hub or a critical hub component goes down and is restarted, there may be no switchover of beams, wherein the hub restarts in bootstrap state.

The transition of the system from initial launch through bootstrap state to steady state and the behavior of the hub and remotes during this transition is discussed below with the help of FIG. 15.

Figure 15:
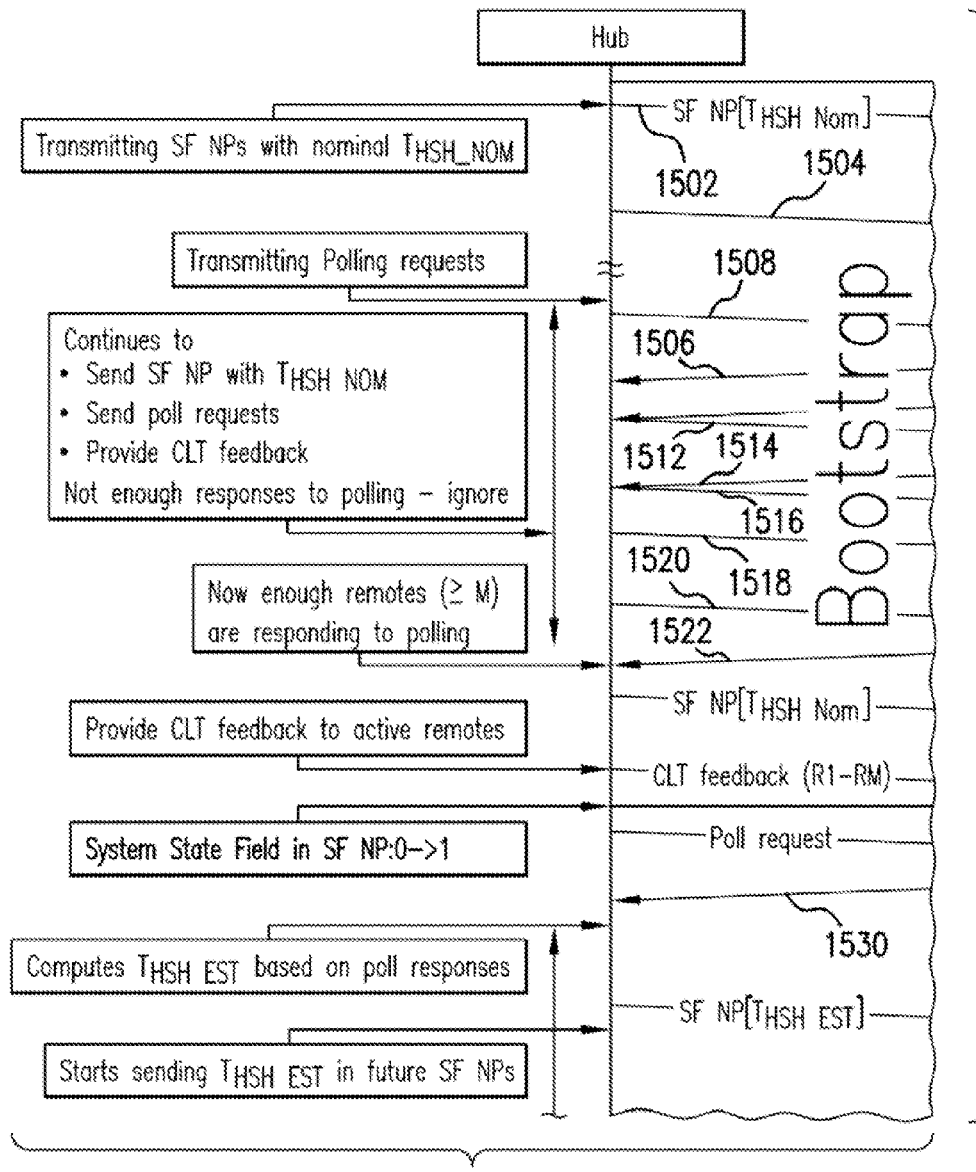
FIG. 15 illustrates the interactions between the hub and remotes as system transitions from bootstrap to steady state, in accordance with an aspect of the invention.
Figures 1, 15:
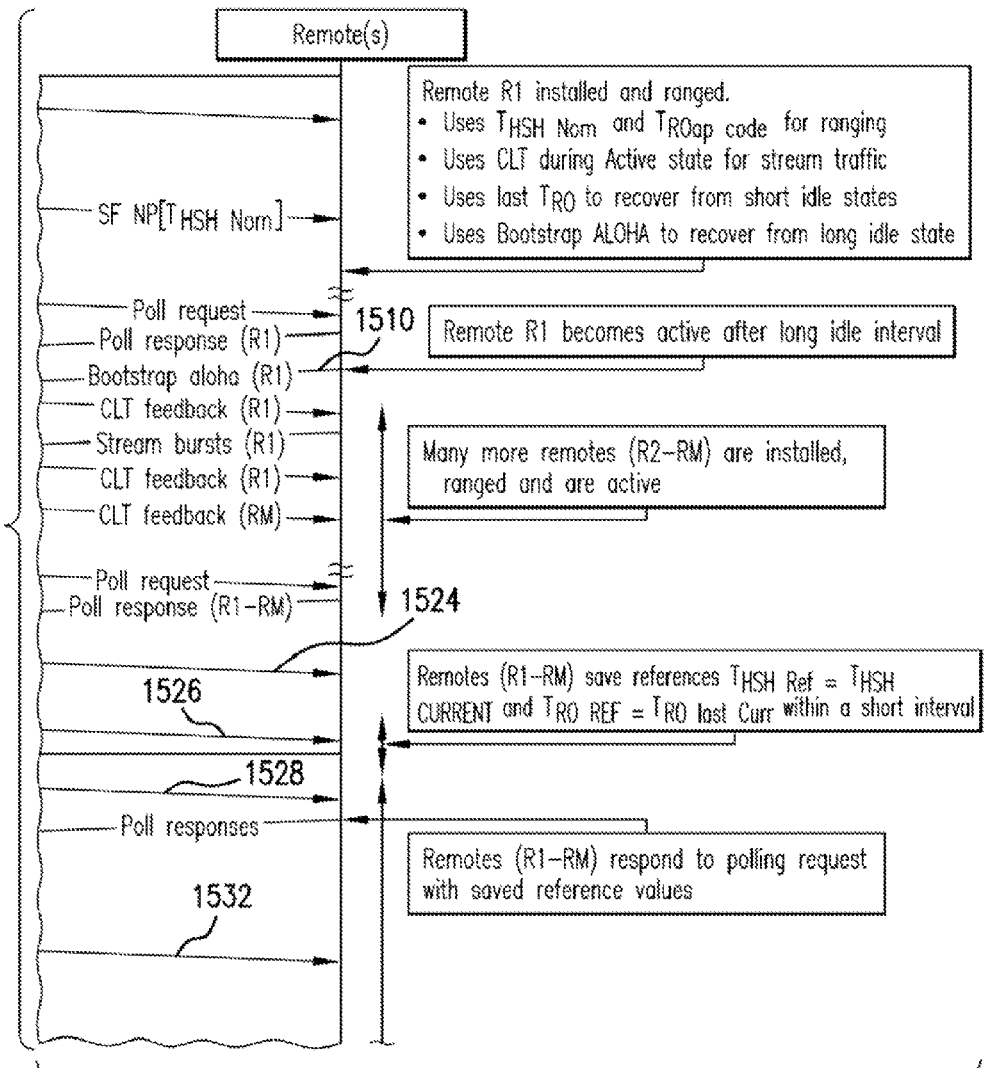
Figures 2, 15:
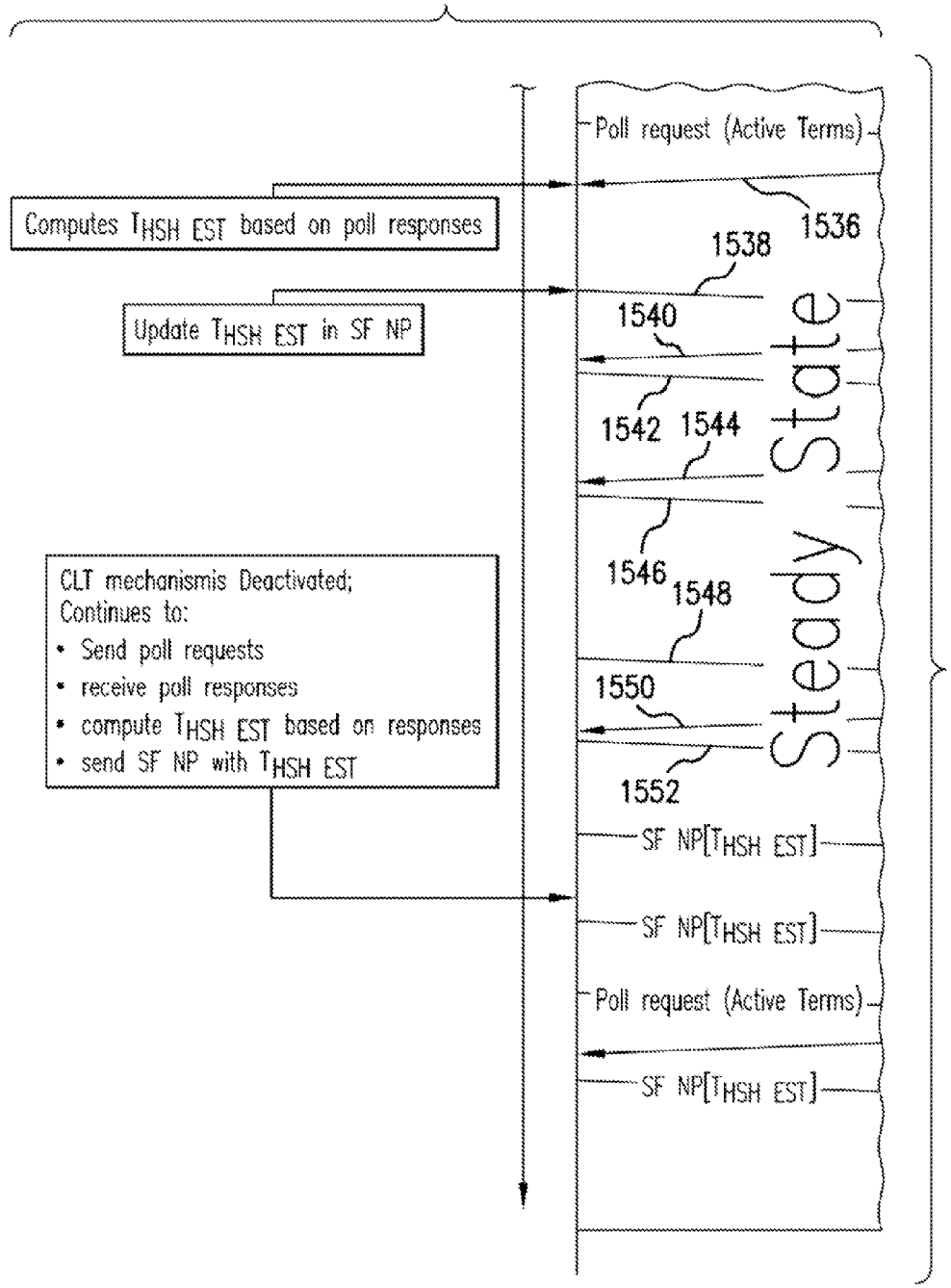
Figures 3, 15:
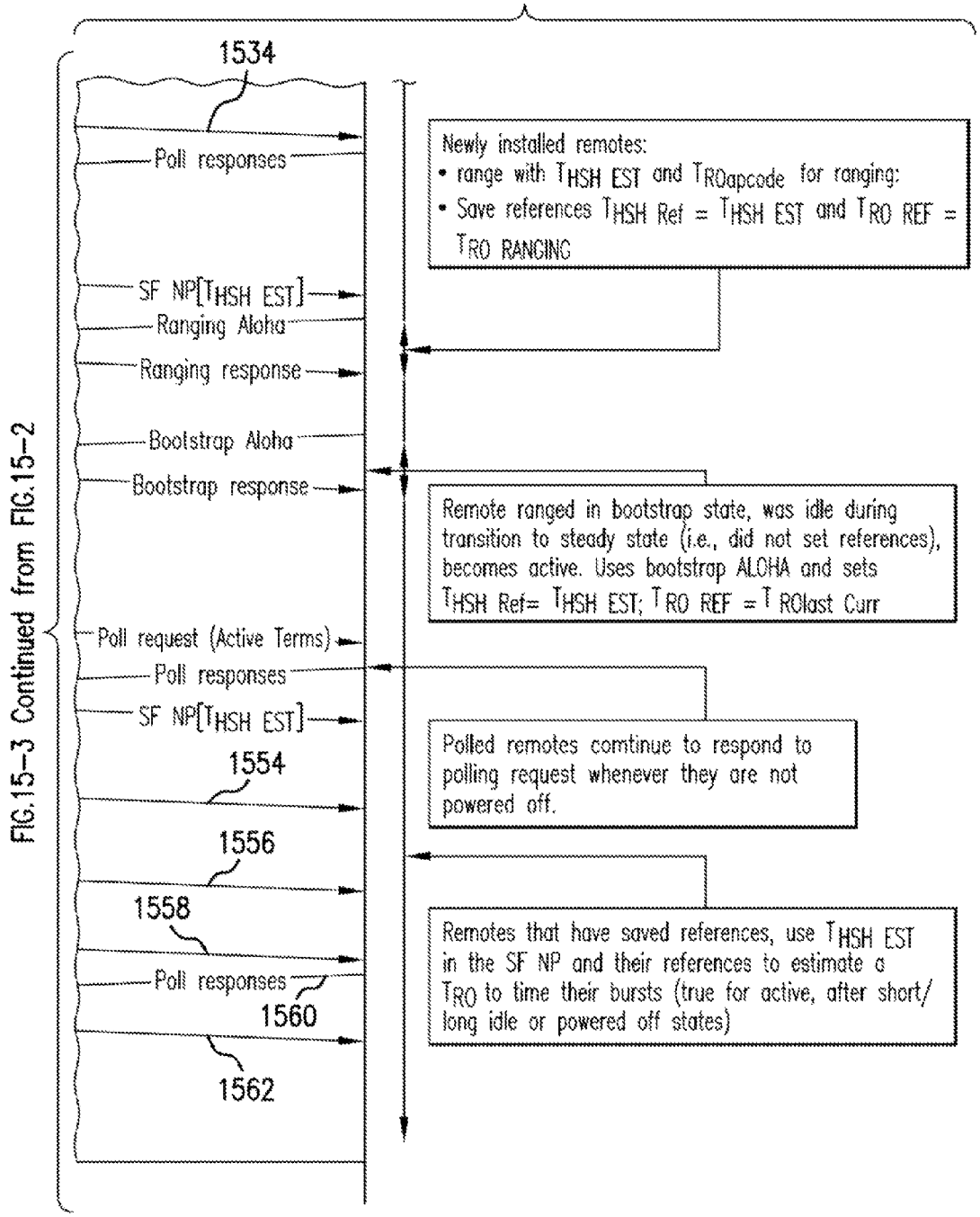

FIG. 15 illustrates the interactions between the hub and remotes as system transitions from bootstrap to steady state, in accordance with an aspect of the invention.

As illustrated in the figure, a process 1500 includes the interactions between the hub and the remote for timing synchronization. Note that the timing values illustrated with reference to the figure are for example only and may not represent the real timing numbers.

At the system launch, in an action 1502 and an action 1504, hub transmits SFNPs to the remotes with a nominal $T_{HSH-NOM}$. SFNP provides an inroute frame number for frame number synchronization, a $T_{HSH}$ value for inroute timing, a System state field, and a CLT On flag. On the remote side, Remote $R_1$ is active after long idle interval and follows installation and ranging procedures.

In an action 1506 hub transmits polling requests to remotes at intervals. Remote $R_1$ transmits a polling response in an action 1508 and performs a boot strap aloha procedure in an action 1510.

Hub continues to send SFNP with $T_{HSH}$-NOM and polling requests. It also provides CLT feedback to remote $R_1$ in an action 1512. Hub ignores the insufficient number of polling responses initially.

On the remote side, many more remotes ($R_2$-$R_M$) are installed, ranged and are active. In an action 1514, remote $R_1$ transmits a stream burst to which hub provides a CLT feedback in an action 1516. Hub provides CLT feedback to remotes ($R_1$-$R_M$).

Hub continues to send poll requests in an action 1520 and receives poll responses from remotes ($R_1$-$R_M$) transmitted in an action 1522. It further continues to send SFNP with $T_{HSH-NOM}$ in an action 1524 and provides CLT feedback to remotes ($R_1$-$R_M$) in an action 1526. Now enough number of remotes are responding to polling for the system to move to steady state.

Remotes ($R_1$-$R_M$) save references $T_{HSH-REF}=T_{HSH-CURRENT}$ and $T_{RO-REF}$ is equal to the previous $T_{RO}$ correction within a short interval.

System state field in SFNP is changed to '1' from '0' to indicate transition to steady state. Hub continues sending poll request in an action 1528.

Remotes ($R_1$-$R_M$) respond to polling request with saved reference values in an action 1530.

Hub computes $T_{HSH-EST}$ based on poll responses and broadcasts it to the remotes in future SFNPs in an action 1532. Hub continues to send poll requests to active remotes in an action 1534.

Remotes respond to poll requests in an action 1536. Newly installed remotes range with $T_{HSH-EST}$ and $T_{RO\ zip\ code}$ for ranging. Remotes save references as $T_{HSH-REF}=T_{HSH-EST}$ and $T_{RO-REF}=T_{RO\ RANGING}$.

Hub computes $T_{HSH-EST}$ based on poll responses and updates $T_{HSH-EST}$ in SFNP in an action 1538.

Newly installed remotes follow ranging aloha procedure in an action 1540 to which hub sends a ranging response in an action 1542.

Remotes which ranged in bootstrap state and were idle during transition to steady state (i.e., did not set references) become active and follow bootstrap aloha procedure in an action 1544. These remotes save references as $T_{HSH-REF}=T_{HSH-EST}$ and $T_{RO-REF}$ is equal to the previous $T_{RO}$ correction. Hub sends a bootstrap aloha response in an action 1546 to these remotes.

Hub deactivates the CLT mechanism now and continues to send poll requests to active remotes in an action 1548. Polled remotes continue to respond to polling request in an action 1550, whenever they are not powered off.

Hub continues to receive poll responses and compute $T_{HSH-EST}$ based on these poll responses. Further, it continues to send SFNP with the computed $T_{HSH-EST}$ to remotes in actions 1552, 1554 and 1556.

Hub continues to send poll requests to active remotes in an action 1558. Polled remotes continue to respond to polling request in an action 1560. Remotes that have saved references use $T_{HSH-EST}$ in the received SFNP and their references to estimate a $T_{RO}$ to time their transmission. This applies to active states, after short or long idle state or powered off states of remotes.

Hub continues to send SFNP with the computed $T_{HSH-EST}$ to remotes in an action 1562.

As discussed earlier, in steady state, a remote with saved references can compute a $T_{RO-EST}$ (based on the $T_{HSH-EST}$ and references) and also a $T_{RO-CLT}$ ($T_{RO}$ corrected based on CLT feedback). A mechanism in accordance with an aspect of the invention is presented next to ensure that the race conditions are avoided and remote properly selects and transitions between $T_{RO-EST}$ and $T_{RO-CLT}$ values. In steady state, the hub is conducting polling, processing the poll responses to estimate the $T_{HSH-EST}$ and advertising it in the SFNP, as described previously. Hub also provides a CLT correction feedback to a remote, if the aperture offset error of a burst exceeds the drift delay threshold as described earlier.

A race condition between $T_{RO-CLT}$ and $T_{RO-EST}$ can occur under a scenario as discussed next. Assume a remote transmits a burst in frame N, at time $t_N$, which was timed using $T_{RO}(t_N)$. Assume this burst is received at hub with aperture offset $\Delta T_{RO}$> drift delay threshold $T_d$. This triggers a CLT message to the remote, with a correction value of $\Delta T_{RO}$. The CLT message is received by the remote at time $t_M$>$t_N$. In fact, assuming a worst case remote-hub propagation delay of N msec, and that the hub waits up to $T_{MaxCLTDelay}$ before the CLT message is transmitted, $t_M-t_N \le T_{MaxCLTDelay}$+2*N sec.

A typical value for $T_{MaxCLTDelay}$ is 1 second in one example. Remote may identify that the received correction is applicable to $T_{RO}(t_N)$, which may not necessarily be the current $T_{RO}$ at the remote. If a polling cycle did not complete in the interval $t_N-t_M$, the value of $T_{HSH-EST}$ did not change, so the current $T_{RO}=T_{RO}(t_N)$. In this case, correction is applicable to the current $T_{RO}$. However, if a polling cycle completed in the interval $t_N-t_M$, the values of $T_{HSH-EST}$ and $T_{RO}$ may have changed. In this case, the current $T_{RO} \ne T_{RO}(t_N)$ and the received correction is not applicable to the current $T_{RO}$.

In order to avoid the race condition, the following measures are proposed. In one embodiment, the CLT correction message shall indicate the inroute frame number for which the correction is applicable. The remote shall keep a record of past {inroute frame number, $T_{RO}$ value used} pairs. This record shall be kept for a duration of at least $T_{MaxCLTDelay}$+2*N sec. This assumes that the hub does not wait more than $T_{MaxCLTDelay}$ sec before transmitting a CLT message after a burst exceeds the drift delay threshold and the maximum remote to hub round trip propagation delay is 2*N sec.

When the remote receives a CLT message with a frame number N, it finds the $T_{RO}$ correction is applicable to from its list of {inroute frame number, $T_{RO}$ value used}. The CLT correction is applied to $T_{RO}(t_N)$ to get $$T_{RO-CLT} = T_{RO}(T_N) + \Delta T_{RO} \quad (12)$$

If for some reason, remote finds that it does not have the record for frame N, it ignores the CLT message.

A method in accordance with an aspect of the invention is presented to combine $T_{RO-EST}$ and $T_{RO-CLT}$ to determine a $T_{RO}$ value. This is only possible in steady state, since $T_{RO-EST}$ is computed using a $T_{HSH-EST}$ and remote references, which are only available in steady state. In steady state, every polling interval of $T_{POLL}$ sec, the hub computes a new $T_{HSH-EST}$ value, which is advertised in the SFNP. A remote with saved references can compute a $T_{RO-EST}$ after it receives each SFNP. This can be used for timing the next superframe.

If remote had transmitted previously and one of its bursts exceeded the drift delay threshold, it will also receive a $T_{RO}$ correction from which it will compute a $T_{RO-CLT}$ as described earlier. From these two different candidates for $T_{RO}$, the remote needs to come up with a single $T_{RO}$ value, which is used for determining the frame timing for the next superframe. An example algorithm for doing so is outlined below in terms of actions executed in each superframe.

First, if no CLT message was received since the last SFNP, $T_{RO}=T_{RO-EST}$ is used for timing the next superframe and wait for the next SFNP. Otherwise, the remote continues onto the second action.

Second, based on the CLT message received since the last SFNP, the $T_{RO-CLT}$ is computed.

Third, a configurable timer $T_{TIMER-CLT}$ is started.

Fourth, $T_{RO}=T_{RO-CLT}$ is used for the timing of the next Superframe. The timer $T_{TIMER-CLT}$ is additionally decremented. If timer has not expired, the remote remains in this action. If $T_{TIMER-CLT}$ has expired, the remote continues to the next action.

Fifth, a transition back to $T_{RO-EST}$ is initiated. In an example embodiment: the remote first waits for the next SFNP. If a CLT message was received in the previous $T_{SF}$ sec (superframe), the $T_{RO-CLT}$ is computed based on the CLT message. Then the remote computes a $T_{RO-EST}$ from the $T_{HSH-EST}$ and saved references. If $|T_{RO-CLT} - T_{RO-EST}| < 1$ μsec, the transition to $T_{RO-EST}$ is complete—and the remote continues to the next action. Otherwise, the remote modifies $T_{RO-CLT}$ by 1 usec as follows: a) if $T_{RO-CLT} < T_{RO-EST}$, increase it by 1 μsec: $T_{RO-CLT} = T_{RO-CLT}+1$; and b) if $T_{RO-CLT} > T_{RO-EST}$, decrease it by 1 μsec: $T_{RO-CLT} = T_{RO-CLT}-1$. Then the remote uses $T_{RO}=T_{RO-CLT}$ for timing for this superframe. At this point, if $|T_{RO-CLT} - T_{RO-EST}| < 1$ μsec, the transition to $T_{RO-EST}$ is complete—and the remote continues to the next action.

Sixth, the remote sets $T_{RO}=T_{RO-EST}$ and returns to the first action.

In the second action, the reason for using the resulting $T_{RO-CLT}$ is that it is guaranteed to have an aperture error $\le 1$'s μsec. In contrast, $T_{RO-EST}$ is likely to have aperture error larger than the drift delay threshold $T_d$ (i.e., $\ge 10$'s μsec) since a CLT message was triggered.

In the first action, note that $T_{RO}=T_{RO-CLT}$ is used at least until the timer expires. A suitable value for the timer is $T_{POLL}$ sec. This guarantees that $T_{RO-CLT}$ is used until a full polling cycle is completed, a new $T_{HSH-EST}$ value is computed and advertised in the SFNP. This addresses the case where there may be a problem with the poll responses and the resulting $T_{HSH-EST}$ value.

The purpose of the fifth action is to transition from $T_{RO-CLT}$ to $T_{RO-EST}$ gradually rather than instantaneously. This is important, since if there is still a serious problem with $T_{RO-EST}$, by switching to it without "validating" it, timing synchronization may be lost. In action 5d, it is checked to see if $T_{RO-EST}$ has moved "close" to $T_{RO-CLT}$, in which case $T_{RO-EST}$ is a valid value and can be safely switched to. If it is not close (Step 5e), $T_{RO-CLT}$ is adjusted in 1 μec actions to gradually move toward $T_{RO-EST}$. In case there is a serious problem with $T_{RO-EST}$ which would result in a large aperture offset error, as $T_{RO-CLT}$ moves towards $T_{RO-EST}$ in 1 usec actions, for some burst, the offset error will cross the drift delay threshold and will trigger another CLT message. This forces the use of $T_{RO-CLT}$ for at least another $T_{TIMER-CLT}$ sec. This process will repeat until $T_{RO-EST}$ has recovered its accuracy.

The $T_{RO}$ value resulting from the above process, for a remote m, after receiving SFNP$_N$, is denoted by $\hat{T}_{RO}(m, t_N)$. This is used in the determination of inroute frame timing of superframe N as will be discussed in greater detail later.

As discussed with reference to FIGS. 4-15, aspects of the invention provide two techniques for timing synchronization, CLT and polling based, which can be combined in different ways for an optimum design. In CLT based approach, hub transmits remote specific timing correction feedback messages on the outroute on as needed basis, which allows the satellite to transmit as close as possible to the middle of the burst aperture. In polling based approach, remotes derive their timing based on a per-beam average delay estimate broadcast by the hub and a measured local delay specific to each outroute stream from the remote. The hub calculates per-beam average delay based on the polling responses from few selected remotes based on the polling requests and broadcasts it to all the remotes in the beam. The remotes use this delay estimate for correcting the timing of their transmission instead of using CLT feedback.

Another example embodiment of the invention will now be described, where triangulation is used to estimate satellite coordinates. This method should be applied in conjunction with CLT.

Hub will poll at least 3 remotes (preferably 4) to send back its current $T_{RO}$. This is done on a superframe basis and the reply needs to arrive within a superframe also. The periodicity of polling could be reduced to N=4 superframes but the reply from the remotes need to arrive within M=2 superframes. The hub calculates the satellite distance $T_{HSH}$ as shown below and transmits that information within the SFNP. With this value being broadcasted in the SFNP, the remote can send the regular aperture aloha even after power up or being idle for a few hours (i.e. not receiving the CLT feedback).

The latitude and longitude positions of the remotes should be known accurately, which in one example, can be obtained using GPS. Calculation of $T_{HSH}$ is performed as discussed below and can be explained with the help of a FIG. 16.

Figure 16:
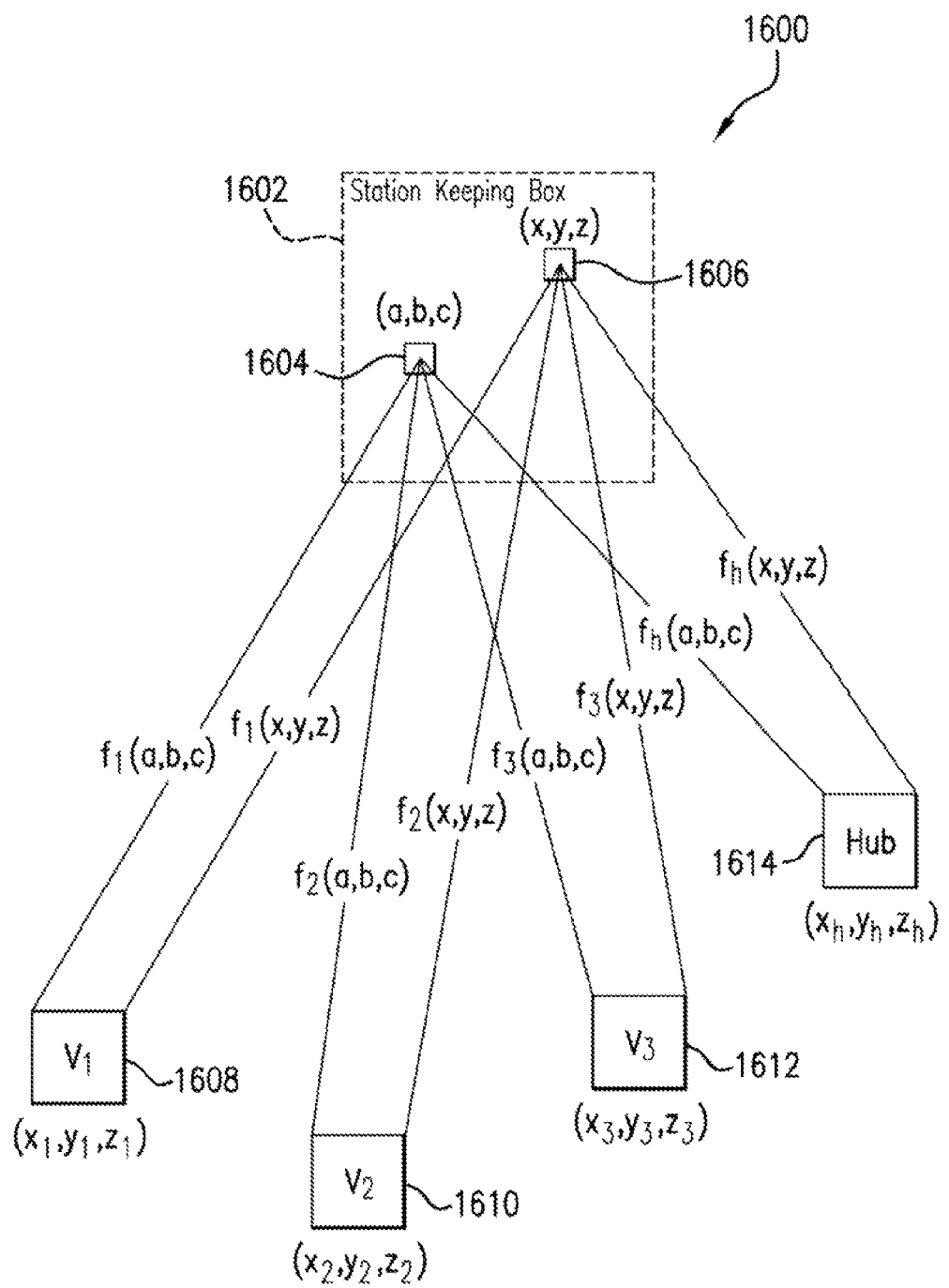
FIG. 16 illustrates an example embodiment of the invention for calculating the satellite coordinates using triangulation.

FIG. 16 illustrates an example embodiment of the invention for calculating the satellite coordinates using triangulation.

A station keeping box 1602 includes the satellite's previously known position 1604, marked as (a, b, c) and satellite's current position 1606, marked as (x, y, z). A remote 1608, a remote 1610 and a remote 1612 communicate with a hub 1614 via station keeping box 1602.

Each of remote 1608, remote 1610 and remote 1612 also reports its latitude and longitude and height and its current $T_{RO}$ when requested by hub 1614.

The following calculations are done at hub 1614. First geodetic latitude/longitude are converted to $X_{EC}, Y_{EC}, Z_{EC}$ in the Earth centered coordinate system:

Intermediate values $R_1$ and $R_2$ are calculated:

$$R_1 \equiv \frac{a}{\sqrt{1-(2f-f^2)\sin^2\phi}} + h \tag{13}$$

$$R_2 \equiv \frac{a(1-f)^2}{\sqrt{1-(2f-f^2)\sin^2\phi}} + h \tag{14}$$

where: a is equatorial Earth radius, f is a flattening factor, h is height in meters of point of interest above the reference ellipsoid, and $$\phi = \text{Latitude}_{deg} * \frac{\pi}{180} \text{(geodetic latitude in radians)}.$$

With respect to h, maximum variations in the height between the reference ellipsoid and mean sea level are about 100 meters and can be ignored. Parameters to be used in the calculations include: Earth equatorial radius (a)=6,378,137 meters (WGS 84 model); Flattening factor (f)=1/298.25722 (WGS 84 model); Orbit radius ($R_{ORB}$)=42,164,000 meters; and Speed of light (c)=299792458 m/sec. $X_{EC}, Y_{EC}, Z_{EC}$ are then calculated:

$$X_{EC} = R_1 \cos\phi \cos\lambda' - R_{ORB} \tag{15}$$

$$Y_{EC} = R_1 \cos\phi \sin\lambda' \tag{16}$$

$$Z_{EC} = R_2 \sin\phi \tag{17}$$

where:

$$\lambda' = (\text{Longitude}_{deg} - \text{SatelliteLongitude}_{deg}) * \frac{\pi}{180} \tag{18}$$

Thus (x, y, z) for each remote and the hub is obtained.

Procedure for determination of the satellite position is discussed below.

Let (a, b, c) be the previous known satellite position at time to. In an example embodiment, initially, it could be the center of the station keeping box. Let (x, y, z) be the current (unknown) satellite position at time $t_1$. Let $f_i(x, y, z)$ be the distance between the current satellite position and the remote i. Let $f_i(a, b, c)$ be the distance between the previous known satellite position and the remote i. Then the distance and time between the hub and the previous known satellite position is calculated:

$$f_{Hub}(a,b,c) = \sqrt{(x_h-a)^2 + (y_h-b)^2 + (z_h-c)^2} \tag{19}$$

$$T_{HS} = \frac{f_{Hub}(a,b,c)}{c} \tag{20}$$

From the measured $T_{RO}$ from each of the remotes, the distance between the remote and the current satellite is calculated $$T_{HO} - T_{RO} = T_{HSH} + T_{RSR} \tag{21}$$

$$T_{RSR} = T_{HO} - T_{RO} - T_{HSH} \tag{22}$$

$$f_i(x,y,z) = \frac{(T_{HO} - T_{RO_i} - 2T_{HS}) * c}{2}, \text{ where } i = 1, 2, 3. \tag{23}$$

The distance between each remote and the previous known satellite position is given by $$f_i(a,b,c) = \sqrt{(a-x_i)^2 + (b-y_i) + (c-z_i)^2} \tag{24}$$

The distance between each remote and the current satellite position is given by $$f_i(x,y,z) = \sqrt{(x-x_i)^2 + (y-y_i)^2 + (z-z_i)^2} \tag{25}$$

By solving equation (25) for (x, y, z) using a Taylor Series expansion

Then the distance from hub to satellite, and back, is calculated and is then converted to time $T_{HSH}$, which is send out on the SFNP $$d = \sqrt{(x-x_h)^2 + (y-y_h)^2 + (z-z_h)^2} \tag{37}$$

$$T_{HSH} = \frac{2d}{c} \tag{38}$$

An example embodiment of hub 1614 that uses the triangulation method as described above, in accordance with an aspect of the present invention will now be described with reference to FIG. 17.

Figure 17:
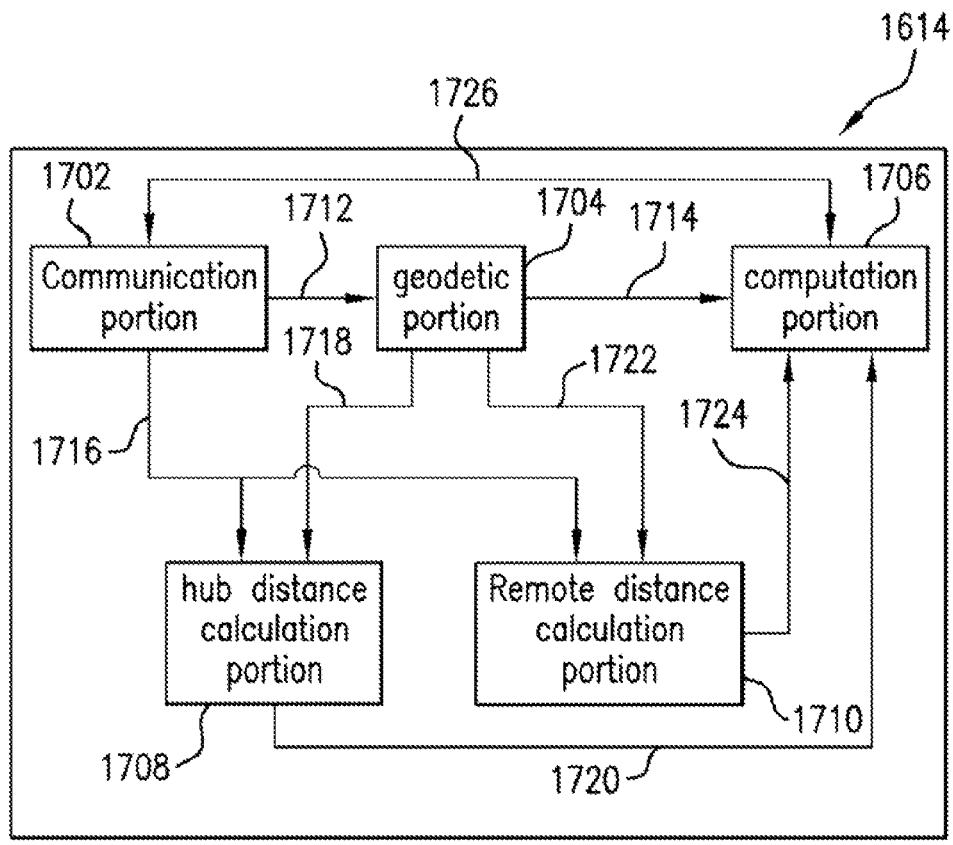
FIG. 17 illustrates an example embodiment of a hub that uses the triangulation method in accordance with an aspect of the present invention.

As illustrated in FIG. 17, hub 1614 includes a communication portion 1702, a geodetic portion 1704, a computation portion 1706, a hub distance calculation portion 1708 and a remote distance calculation portion 1710. In this example communication portion 1702, geodetic portion 1704, computation portion 1706, hub distance calculation portion 1708 and remote distance calculation portion 1710 are distinct elements. However, in some embodiments, at least two of communication portion 1702, geodetic portion 1704, computation portion 1706, hub distance calculation portion 1708 or remote distance calculation portion 1710 may be combined as a unitary element. In other embodiments, at least one of communication portion 1702, geodetic portion 1704, computation portion 1706, hub distance calculation portion 1708 or remote distance calculation portion 1710 may be implemented as a computer having stored therein tangible computer-readable media for carrying or having computer-executable instructions or data structures stored thereon.

Communication portion 1702 communicates with geodetic portion 1704 via a signal 1712, with hub distance calculation portion 1708 and remote distance calculation portion 1710 via a signal 1716. Additionally, communication portion 1702 bi-directionally communicates with computation portion 1706 via a signal 1726.

Communication portion 1702 is operable to receive a plurality of bursts from the satellite, which may be transmitted from remote 1608, remote 1610 and remote 1612 with reference to FIG. 16. Each burst received by communication portion 1702 includes a corresponding estimated propagation delay for each remote and also the latitude, longitude and height information.

Geodetic portion 1704 communicates with computation portion 1706 via a signal 1714, communicates with hub distance calculation portion 1708 via a signal 1718, and communicates with remote distance calculation portion 1710 via a signal 1722.

Geodetic portion 1704 is operable to receive the latitude, longitude and height information for each remote from communication portion 1702 and provides $X_{EC}$, $Y_{EC}$, $Z_{EC}$ to hub distance calculation portion 1708 and remote distance calculation portion 1710 for calculating the distance of the hub and the remotes from the satellite's known position.

Hub distance calculation portion 1708 is operable to provide the distance between the hub and the satellite based on the coordinates provided by geodetic portion 1704, as indicated by equation (19), to computation portion 1706 via a signal 1720.

Remote distance calculation portion 1710 is operable to provide the distance between each remote and the satellite based on the coordinates provided by geodetic portion 1704, as indicated by equation (24), to computation portion 1706 via a signal 1724.

Computation portion 1706 is operable to compute the current position of the satellite based on the distance between the hub and the satellite provided by hub distance calculation portion 1708, the distance between each remote and the satellite provided by remote distance calculation portion 1710 and the corresponding estimated propagation delay for each remote.

Once the current satellite position is determined, the distance from hub to satellite, and back, is calculated and is then converted to time $T_{HSH}$, which is send out on the SFNP as indicated by equation (38).

Another alternative method to track the motion of the satellite is to use the ephemeris data of the satellite. The ephemeris data consist of the x, y and z coordinates of the satellite every five minutes. These are predicted ahead of time for three days and the files containing this data is provided to the hubs from the Satellite Control Center. Since the position of the hub and the satellite are both known, the time delay $T_{HSH}$ can be calculated and then transmitted on the SFNP.

A further refinement is possible if remote coordinates are also known accurately (for e.g., entered during installation using GPS coordinates). In this case, the hub can advertise the current coordinates of the satellite to all the remotes in the beam, based on ephemeris data in the SFNP. Since the remote has knowledge of remote, satellite and hub coordinates, each remote can compute its inroute timing (i.e., $T_{RO}$) precisely.

An alternative algorithm in an example embodiment is proposed, which uses hub burst timing instead of relying on polling. It relies on hub measuring the burst offsets of traffic bursts and estimation of a beam average $T_{RO}$, which is advertised in SFNP. This algorithm has advantages over the current approach as well as implications on the implementation and processing required at the hub.

An example algorithm in accordance with an aspect of the invention is outline below.

First the hub broadcasts a SFNP, which has a field called $T_{RO\text{-}AVG}$. Initially, when no remotes exist in the initial bootstrap state, this field contains a nominal value. The nominal value can be the $T_{RO}$ value computed using beam center and satellite CoB coordinates. The hub continues to advertise the nominal value until a remote ranges and starts transmitting bursts. Once the hub receives a few bursts, it starts updating the $T_{RO\text{-}AVG}$ and can transition to steady state.

For purposes of discussion, let a remote m be added to the initial bootstrap state at time $t_0$. The remote m ranges, and gets its ideal $T_{RO}(=T_{RO\text{-}RNG}(m))$ based on ranging feedback. The remote m computes a "unique offset"

$$\Delta T_{RO}(m) = T_{RO\text{-}RNG}(m) - T_{RO\text{-}AVG}(t_0) \tag{39}$$

The remote m then saves the computed unique offset in its non-volatile memory. All remotes save their "unique offset" when they range.

When the hub receives a burst from any remote m at a time t, a few things occur. The hub computes the offset of the burst from aperture center, say e(m,t). This represents the error between the ideal $T_{RO}$ and the $T_{RO}$ estimate used by the remote. It may also include any other random error in the system, which are ignored for the time being:

$$e(m,t)T = T_{RO\text{-}IDEAL}(n,t) - T_{R0}(m,t) \tag{40}$$

Note that only the error is needed, not the ideal or actual $T_{RO}$ values. Over a period of time $[t_1\text{-}t_2]$, hub computes the average of offsets of all the bursts received during this interval:

$$e_{AVG}(t_1,t_2) = \text{Average of } e(*,t) \text{ for all bursts received for } t \text{ in } (t_1\text{-}t_2)$$

At a time $t_2$, the hub updates its advertised $T_{RO\text{-}AVG}$ as follows:

$$T_{RO\text{-}AVG}(t_2) = T_{RO\text{-}AVG}(t_1) + e_{AVG}(t_1,t_2) \tag{41}$$

This process continues in steady state. The interval of averaging $[t_1\text{-}t_2]$ should not exceed a few seconds. Also, to limit processing load, a randomly selected subset of bursts, rather than all the bursts, may be used in the averaging.

A remote that wishes to transmit a burst at time t, computes its $T_{RO}$ using the currently advertised $T_{RO\text{-}AVG}(t)$ and its saved unique offset $\Delta T_{RO}$, as follows:

$$T_{RO}(m,t) = T_{RO\text{-}AVG}(t) + \Delta T_{RO}(m) \tag{42}$$

The basic idea is that, if on the average bursts are coming in late, then reduce the advertised $T_{RO\text{-}AVG}$ in the SFNP, so that future computed $T_{RO}$s at remotes are reduced. If bursts are arriving early on the average, then increase the $T_{RO\text{-}AVG}$.

Figure 18:
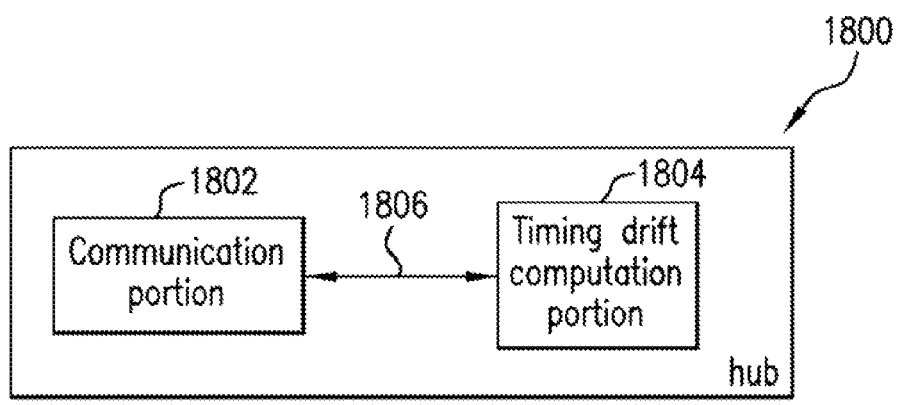
FIG. 18 illustrates an example embodiment of a hub for use in a hub burst arrival method, in accordance with an aspect of the present invention.

An example embodiment of a hub for use in a hub burst arrival method, in accordance with an aspect of the present invention will now be described with reference to FIG. 18.

As illustrated in the figure, a hub 1800 includes a communication portion 1802 and a timing drift computation portion 1804. In this example, communication portion 1802 and timing drift computation portion 1804 are distinct elements. However, in some embodiments, communication portion 1802 and timing drift computation portion 1804 may be combined as a unitary element. In other embodiments, at least one of communication portion 1802 and timing drift computation portion 1804 may be implemented as a computer having stored therein tangible computer-readable media for carrying or having computer-executable instructions or data structures stored thereon.

Communication portion 1802 bi-directionally communicates with timing drift computation portion 1804 via a signal 1806.

Communication portion 1802 is operable to receive a plurality of bursts from the satellite and is further operable to transmit the average offset calculated by timing drift computation portion 1804 to the remotes via the satellite.

Timing drift computation portion 1804 is operable to compute a plurality of offsets corresponding to the plurality of bursts, respectively, from an aperture center, and to calculate an average offset based on the plurality of offsets. The offset of the burst from the aperture center for a remote m computed by the hub is represented by equation (40). The average of offsets of all the bursts received over a period of time is used by the hub to calculate its advertised $T_{RO-AVG}$ that is transmitted to the remotes by communication portion 1802.

Figure 19:
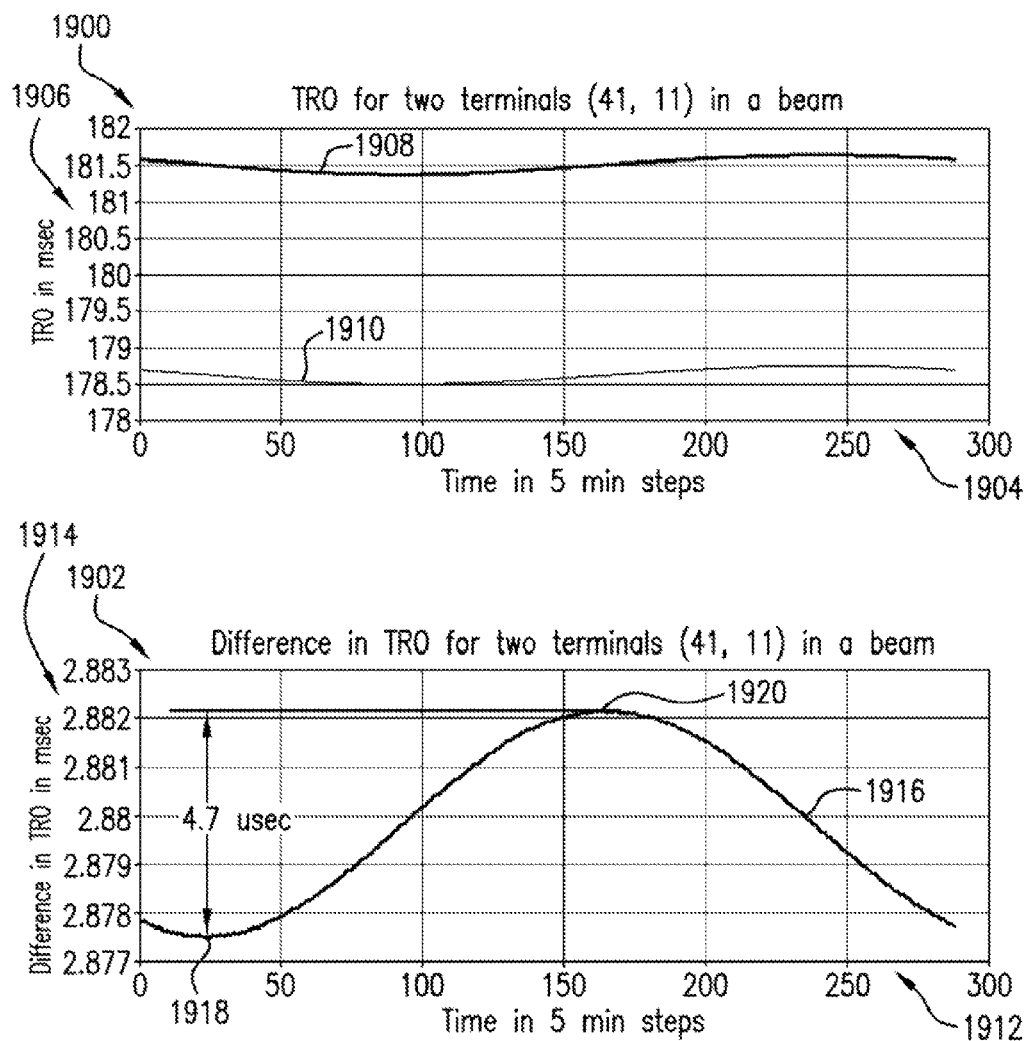
FIG. 19 illustrates the timing relationship of two remotes in a beam with respect to $T_{RO}$ in an example embodiment.

FIG. 19 illustrates the timing relationship of two remotes in a beam with respect to $T_{RO}$ in an example embodiment.

As illustrated in the figure, a plot 1900 includes an x-axis 1904 for time (minute) and a y-axis 1906 for $T_{RO}$ (msec). A curve 1908 represents $T_{RO}$ for remote 1 (terminal 1) and a curve 1910 represents $T_{RO}$ for remote 2 (terminal 2). Another curve 1902 includes an x-axis 1912 for time (minute) and a y-axis 1914 for difference in $T_{RO}$ (msec). A curve 1916 represents the difference in remote 1 and remote 2. Remote 1 and remote 2 may be spatial separated within the beam.

The $T_{RO-AVG}$ can be thought of as a beam-average $T_{RO}$ (and added to a constant). If incoming bursts are uniformly distributed in the beam, this average is the $T_{RO}$ of a remote at the center of the beam. In general, this average is constantly moving around towards the instantaneous "center of inroute traffic mass." Of course, if the traffic is skewed towards one part of the beam, the average is also skewed. The algorithm relies on the fact that even in the presence of errors (spatial, temporal and random), the $T_{RO-AVG}$ will correspond to some point within the beam and not drift out of the beam.

This can introduce an error, as illustrated by curve 1916, since the change required for a particular remote may be different from the average. But this error can be bounded to a small value, since the spot beams are limited in size. For example, consider that the bursts are from one corner of the beam and hence the average burst offset shifts the $T_{RO-AVG}$ toward that corner of the beam. For a remote in the opposite corner of the beam, there would be an error due to the spatial separation between the two corners. At any instant in time, given the $T_{RO}$ value for any remote within the beam, the $T_{RO}$ value of any other remote in the beam can be expressed as being equal to the constant offset plus the error, where the error is <=±2.35 μsec in magnitude. So the error due to spatial separation is <=2*2.35 usec=4.7 usec (as shown by points 1918 and 1920). There will also be a temporal error due to the update interval, but this should be negligible as long as update interval is limited to a few seconds. The aperture would have to account for these errors and also the errors due to timing measurement accuracies at hub and remote.

The issue of whether these errors can accumulate over time and cause the $T_{RO-AVG}$ to diverge is a concern. This has been looked at to some extent and it does not appear to be the case.

The method also assumes that no beam straddles the satellite longitude. If this was not the case, the remotes on either side can drift uniformly, the average burst offset would be zero, but remotes could drift out of the aperture.

The method discussed above, has similarities (for example, bootstrap, polling outage, saving references, advertised average estimate, etc) with the $T_{HSH}$ estimation approach as discussed earlier but there are differences as well. Differences between the two approaches are highlighted below.

First, there is no polling process, so there are no polling requests or polling responses. The hub uses aperture offsets of traffic bursts to compute its advertised value of $T_{RO-AVG}$.

Second, since the interval between traffic bursts is much smaller than the typical polling interval (few secs vs 100 s of secs), it is possible to update the $T_{RO-AVG}$ more often. This means that the untracked drift delay between polls need not be accounted for in the aperture length. Aperture lengths can therefore be smaller (by a few usec). Of course, the same is possible in the $T_{HSH}$ estimation method if the polling interval is reduced to a few seconds.

Third, if there is no inroute traffic, a situation analogous to polling outage exists, i.e., $T_{RO-AVG}$ cannot be updated and the drift delay is not tracked. After some time (a few seconds), $T_{RO-AVG}$ cannot be used to time the bursts. The hub may go into a "polling outage" state and advertise this state in the SFNP. A remote that comes on after this state is reached may use bootstrap aloha to time its first burst. When the hub receives the bootstrap aloha burst, it can resume updating the $T_{RO-AVG}$.

Fourth, there are implications for hub processing/implementation. The hub has to process each incoming burst (or a randomly selected subset of bursts), i.e., the burst offset for each burst has to be computed and averaged over an interval of a few seconds. This process has to be maintained on a continuous basis.

A timing synchronization technique in accordance with aspects of the present invention can be used in a system that does not have access to satellite ephemeris information at the gateway or the terminal.

Further, a timing synchronization technique in accordance with aspects of the present invention can be used in a system in which the gateway is unable to receive its own transmission, because the gateway may be located outside of the beam coverage area from the satellite. In contrast with some conventional systems, a gateway must be located within the beam coverage area because it must be able to receive its own transmission to determine the satellite position.

Further, a timing synchronization technique in accordance with aspects of the present invention can be used regardless of the locations of the gateway and the beam as well as the shape of the beam (spot beam or CONUS beam). Additionally, the gateway and the user beams maybe located in a different hemispheres or continents.

Further, a timing synchronization technique in accordance with aspects of the present invention does not rely on the accurate knowledge of the location of the terminal via GPS. However, GPS information may be used to enhance the particular aspects.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A method of communicating from a remote to a hub by way of a satellite, the satellite being operable to bi-directionally communicate with the hub and the remote, the hub having assigned a timeslot for communication with the remote, the hub being operable to transmit a request for a drift delay to the remote by way of the satellite and to transmit an estimated propagation delay to the remote by way of the satellite, the drift value being based on a difference between an initial timing reference and a subsequent timing reference as a result of a change of position of the satellite, said method comprising:

determining, at the remote, a first remote offset time for communication with the hub by way of the satellite at a first time;
   determining, at the remote, a second remote offset time for communication with the hub by way of the satellite at a second time;
   determining, at the remote, a drift delay based on the first remote offset time and the second remote offset time;
   receiving, at the remote, the request for the drift value;
   transmitting, from the remote, the drift delay to the hub by way of the satellite; receiving, at the remote, the estimated propagation delay; and
   generating, at the remote, a third remote offset time based on the second remote offset time and the estimated propagation delay.

2. The method of claim 1, further comprising receiving, at the remote, a closed loop feedback message from the hub including aperture offset error information.

3. The method of claim 2, wherein said generating, at the remote, a third remote offset time based on the second remote offset time and the estimated propagation delay comprises generating, at the remote, the third remote offset time based additionally on the aperture offset error information.

4. A remote for communicating with a hub by way of a satellite, the satellite being operable to bi-directionally communicate with the hub and said remote, the hub having assigned a timeslot for communication with said remote, the hub being operable to transmit a request for a drift delay to said remote by way of the satellite and to transmit an estimated propagation delay to said remote by way of the satellite, the drift value being based on a difference between an initial timing reference and a subsequent timing reference as a result of a change of position of the satellite, said remote comprising:

a communication portion operable to bi-directionally communicate with the satellite;
   a timing portion operable to determine a first remote offset time for communication with the hub by way of the satellite at a first time and to determine a second remote offset time for communication with the hub by way of the satellite at a second time; and
   a drift delay portion operable to determine a drift delay based on the first remote offset time and the second remote offset time;
   wherein said communication portion is further operable to receive the request for the drift value,
   wherein said communication portion is further operable to transmit the drift delay to the hub by way of the satellite,
   wherein said communication portion is further operable to receive the estimated propagation delay, and
   wherein said timing portion is further operable to generate a third remote offset time based on the second remote offset time and the estimated propagation delay.

5. The remote of claim 4, wherein said communication portion is further operable to receive a closed loop feedback message from the hub including aperture offset error information.

6. The remote of claim 5, wherein said timing portion is operable to generate the third remote offset time based additionally on the aperture offset error information.

* * * * *